United States Patent [19]
Tran et al.

[11] Patent Number: 6,049,863
[45] Date of Patent: Apr. 11, 2000

[54] PREDECODING TECHNIQUE FOR INDICATING LOCATIONS OF OPCODE BYTES IN VARIABLE BYTE-LENGTH INSTRUCTIONS WITHIN A SUPERSCALAR MICROPROCESSOR

[75] Inventors: Thang M. Tran; Rammohan Narayan; Andrew McBride; Karthikeyan Muthusamy, all of Austin, Tex.

[73] Assignee: Advanced Micro Devices, Inc., Sunnyvale, Calif.

[21] Appl. No.: 08/873,344

[22] Filed: Jun. 11, 1997

Related U.S. Application Data

[63] Continuation-in-part of application No. 08/878,228, Jun. 18, 1997, Pat. No. 5,884,058, which is a continuation of application No. 08/685,656, Jul. 24, 1996, abandoned.

[51] Int. Cl.[7] ........................................... G06F 9/30
[52] U.S. Cl. .......................... 712/213; 712/204; 712/210
[58] Field of Search .................................... 395/380, 386, 395/389; 712/210, 213, 204

[56] References Cited

U.S. PATENT DOCUMENTS

| | | | |
|---|---|---|---|
| 4,044,338 | 8/1977 | Wolf | 365/49 |
| 4,453,212 | 6/1984 | Gaither et al. | 711/2 |
| 4,807,115 | 2/1989 | Torng | 712/215 |

(List continued on next page.)

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 0 651 324 | 5/1995 | European Pat. Off. . |
| 0 718 758 | 6/1996 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter 2: Microprocessor Architecture Overview," pp. 2–1 through 2–4.
Michael Slater, "AMD's K5 Designed to Outrun Pentium," Microprocessor Report, vol. 8, No. 14, Oct. 24, 1994, 7 pages.
Sebastian Rupley and John Clyman, "P6: The Next Step?," PC Magazine, Sep. 12, 1995, 16 pages.
Tom R. Halfhill, "AMD K6 Takes On Intel P6," BYTE, Jan. 1996, 4 pages.

*Primary Examiner*—Kenneth S. Kim
*Attorney, Agent, or Firm*—Conley, Rose & Tayon, PC; B. Noel KIvlin

[57] ABSTRACT

A predecode unit is configured to predecode variable byte-length instructions prior to their storage within an instruction cache of a superscalar microprocessor. The predecode unit generates three predecode bits associated with each byte of instruction code: a "start" bit, an "end" bit, and a "functional" bit. The start bit is set if the associated byte is the first byte of the instruction. Similarly, the end bit is set if the byte is the last byte of the instruction. The functional bits convey information regarding the location of an opcode byte for a particular instruction as well as an indication of whether the instruction can be decoded directly by the decode logic of the processor or whether the instruction is executed by invoking a microcode procedure controlled by an MROM unit. For fast path instructions, the functional bit is set for each prefix byte included in the instruction, and cleared for other bytes. For MROM instructions, the functional bit is cleared for each prefix byte and is set for other bytes. The type of instruction (either fast path or MROM) may thus be determined by examining the functional bit corresponding to the end byte of the instruction. If that functional bit is clear, the instruction is a fast path instruction. Conversely, if that functional bit is set, the instruction is an NMOM instruction. After an MROM instruction is identified, the functional bits for the instruction may be inverted. Subsequently, the opcode for both fast path and MROM instructions may readily be located (by the alignment logic) by determining the first byte within the instruction that has a cleared functional bit.

18 Claims, 18 Drawing Sheets

| Predecode Bits | Byte Number | Type of Instruction |
|---|---|---|
| Start bit<br>Func bit | 1000<br>1111 | MROM, no prefix<br>opcode is at first byte. |
| Start bit<br>Func bit | 1000<br>0111 | MROM, one prefix<br>opcode is at second byte. |
| Start bit<br>Func bit | 10000<br>00011 | MROM, three prefixes<br>opcode is at fourth byte. |
| Start bit<br>Func bit | 1000<br>0000 | Fast path, no prefix<br>opcode is at first byte |
| Start bit<br>Func bit | 1000<br>1000 | Fast path, one prefix<br>opcode is at second byte |
| Start bit<br>Func bit | 10000<br>11100 | Fast path, three prefix<br>opcode is at fourth byte |

U.S. PATENT DOCUMENTS

| | | | |
|---|---|---|---|
| 4,858,105 | 8/1989 | Kuriyama et al. | 712/235 |
| 4,928,223 | 5/1990 | Dao et al. | 712/247 |
| 5,053,631 | 10/1991 | Perlman et al. | 708/508 |
| 5,058,048 | 10/1991 | Gupta et al. | 708/508 |
| 5,129,067 | 7/1992 | Johnson | 712/213 |
| 5,136,697 | 8/1992 | Johnson | 712/239 |
| 5,226,126 | 7/1993 | McFarland et al. | 712/218 |
| 5,226,130 | 7/1993 | Favor et al. | 712/238 |
| 5,337,415 | 8/1994 | DeLano et al. | 711/220 |
| 5,586,276 | 12/1996 | Grochowski et al. | 712/204 |
| 5,598,544 | 1/1997 | Ohshima | 712/204 |
| 5,600,806 | 2/1997 | Brown et al. | 712/204 |
| 5,644,744 | 7/1997 | Mahin et al. | 712/207 |
| 5,689,672 | 11/1997 | Witt et al. | 712/213 |
| 5,758,114 | 5/1998 | Johnson et al. | 712/204 |
| 5,758,116 | 5/1998 | Lee et al. | 712/210 |
| 5,852,727 | 12/1998 | Narayan et al. | 712/215 |

Generic X86 Instruction Format

|     | mod | reg | r/m |
|-----|-----|-----|-----|
| (a) | 11  | rrr | reg |

|     | mod | reg | r/m |
|-----|-----|-----|-----|
| (b) | 00  | rrr | reg |

|     | mod | reg | r/m | 4-byte offset |
|-----|-----|-----|-----|---------------|
| (c) | 00  | rrr | 101 |               |

|     | mod | reg | r/m | 1-byte offset |
|-----|-----|-----|-----|---------------|
| (d) | 01  | rrr | reg |               |

|     | mod | reg | r/m | 4-byte offset |
|-----|-----|-----|-----|---------------|
| (e) | 10  | rrr | 101 |               |

|     | mod | reg | r/m | scl | idx | base |
|-----|-----|-----|-----|-----|-----|------|
| (f) | 00  | rrr | 100 | ss  | xxx | bbb  |

|     | mod | reg | r/m | scl | idx | base | 1-byte offset |
|-----|-----|-----|-----|-----|-----|------|---------------|
| (g) | 00  | rrr | 100 | ss  | xxx | bbb  |               |

|     | mod | reg | r/m | scl | idx | base | 4-byte offset |
|-----|-----|-----|-----|-----|-----|------|---------------|
| (h) | 00  | rrr | 100 | ss  | xxx | bbb  |               |

FIG. 1C
(PRIOR ART)

| Definitions of the Encoding for the mod Field of the Addressing Mode Byte in 16-Bit Mode | |
|---|---|
| mod 00b | interpretation<br>if r/m=110b, then mod-00b indicates that a register operand is specified by the r/m field. The register must be a base register (BP or BX), index register (SI or DI), or a combination of base and index registers.<br>If, however, r/m=110b, the operand is not a register. it is a 16-bit memory displacement from the beginning of the segment and is encoded as part of the instruction. |
| 01b | An 8-bit signed displacement (disp8) is included in the encoding. The byte will be sign-extended and added to the register operand specified by the r/m field. |
| 10b | A 16-bit signed displacement (disp-16) is included in the encoding that will be added to the register operand specified by the r/m field. |
| 11b | The instruction references two registers. The reg field specifies the destination operand and the r/m field specifies the source operand. The w field in the opcode specifies the size of the operands. No memory reference is included in the instruction. |

FIG. 1D

| Interpretation of the r/m Field in 16-Bit Mode | | | | | |
|---|---|---|---|---|---|
| r/m | mod=00b | mod=01b | mod=10b | mod=11b w=0 | w=1 |
| 000b | DS:[BX+SI] | DS:[BX+SI+disp8] | DS:[BX+SI+disp16] | AL | AX |
| 001b | DS:[BX+DI] | DS:[BX+DI+disp8] | DS:[BX+DI+disp16] | CL | CX |
| 010b | SS:[BP+SI] | SS:[BP+SI+disp8] | SS:[BP+SI+disp16] | DL | DX |
| 011b | SS:[BP+DI] | SS:[BP+DI+disp8] | SS:[BP+DI+disp16] | BL | BX |
| 100b | DS:[SI] | DS:[SI+disp8] | DS:[SI+disp16] | AH | SP |
| 101b | DS:[DI] | DS:[DI+disp8] | DS:[DI+disp16] | CH | BP |
| 110b | DS:[disp16] | SS:[BP+disp8] | SS:[BP+disp16] | DH | SI |
| 111b | DS:[BX] | DS:[BX+disp8] | DS:[BX+disp16] | BH | DI |

FIG. 1E

| Definitions of the Encoding for the mod Field of the Addressing Mode Byte in 32-Bit Mode | |
|---|---|
| mod 00b | interpretation<br>if r/m=100b, and r/m =101b, then a 32-bit register operand is specified by the r/m field. The register may be a single general-purpose register (EAX, EBX, ECX, or EDX) or an index register (ESI or EDI) without scaling.<br>If r/m=100b, then the SIB byte is present and indicates the addressing format.<br>If r/m=101b, then a memory operand is specified by a 32-bit unsigned displacement encoded as part of the instruction. |
| 01b | If r/m=100b, then the SIB byte is present and indicates the addressing format.<br>If r/m=101b, an 8-bit signed displacement (disp8) is included in the encoding. The byte will be sign-extended and added to the register operand specified by the r/m field. |
| 10b | If r/m=100b, then the SIB byte is present and indicates the addressing format.<br>If r/m=101b, a 32-bit signed displacement (disp16) is included in the encoding that will be added to the register operand specified by the r/m field. |
| 11b | The instruction references two registers (the size is determined by the w field in the opcode). The reg field specifies the destination operand and the r/m field specifies the source operand. No memory reference is included in the instruction. |

FIG. 1F

| Interpretation of the r/m Field in 32-Bit Mode | | | | | |
|---|---|---|---|---|---|
| r/m | mod=00b | mod=01b | mod=10b | mod=11b<br>w=0 | w=1 |
| 000b | DS:[EAX] | DS:[EAX+disp8] | DS:[EAX+disp32] | AL | EAX |
| 001b | DS:[ECX] | DS:[ECX+disp8] | DS:[ECX+disp32] | CL | ECX |
| 010b | DS:[EDX] | DS:[EDX+disp8] | DS:[EDX+disp32] | DL | EDX |
| 011b | DS:[EBX] | DS:[EBX+disp8] | DS:[EBX+disp32] | BL | EBX |
| 100b[1] | [SIB] | [SIB+disp8] | [SIB+disp32] | AH | ESP |
| 101b | DS:[off32] | DS:[EBP+disp8] | DS:[EPB+disp32] | CH | EBP |
| 110b | DS:[ESI] | DS:[ESI+disp8] | DS:[ESI+disp32] | DH | ESI |
| 111b | DS:[EDI] | DS:[EDI+disp8] | DS:[EDI+disp32] | BH | EDI |

[1] An r/m value of 100b implies that the SIB byte is present and represents an addressing mode of the form [base + scale*index].

FIG. 1G

| Predecode Bits | Byte Number | Type of Instruction |
|---|---|---|
| Start bit<br>Func bit | 1000<br>1111 | MROM, no prefix opcode is at first byte. |
| Start bit<br>Func bit | 1000<br>0111 | MROM, one prefix opcode is at second byte. |
| Start bit<br>Func bit | 10000<br>00011 | MROM, three prefixes opcode is at fourth byte. |
| Start bit<br>Func bit | 1000<br>0000 | Fast path, no prefix opcode is at first byte |
| Start bit<br>Func bit | 1000<br>1000 | Fast path, one prefix opcode is at second byte |
| Start bit<br>Func bit | 10000<br>11100 | Fast path, three prefix opcode is at fourth byte |

FIG. 3

Valid Combinations of Instructions within a Subqueue

| I2 | I1 | I0 |
|---|---|---|
| X | X | X |
| X | X | A |
| X | B | A |
| C | B | A |
| O | X | X |
| O | X | A |
| O | B | A |

| Multiplexor | Positions Analyzed | | |
|---|---|---|---|
| | Subqueue Zero 86A | Subqueue One 86B | Subqueue Two 86C |
| 120A | I0, O | I0, O | I0 |
| 120B | I1, O | I0, I1, O | I0, I1 |
| 120C | I2, O | I0, I1, I2, O | I0, I1, I2 |
| 120D | — | I0, I1, I2, O | I0, I1, I2 |

Final Issue Position Combinations

| Issue Position 0 | Issue Position 1 | Issue Position 2 |
|---|---|---|
| — | — | — |
| F | — | — |
| F | F | — |
| F | F | F |
| M | F | — |
| F | M | — |
| M | — | — |

FIG. 11

PREDECODING TECHNIQUE FOR INDICATING LOCATIONS OF OPCODE BYTES IN VARIABLE BYTE-LENGTH INSTRUCTIONS WITHIN A SUPERSCALAR MICROPROCESSOR

This is a continuation-in-part of U.S. Pat. application Ser. No. 08/878,228, filed on Jun. 18, 1997, now U.S. Pat. No. 5,884,058, which is a file wrapper Continuation of U.S. patent application Ser. No. 08/685,656, filed Jul. 24, 1996 now abandoned.

BACKGROUND OF THE INVENTION

1. Field of the Invention

This invention relates to superscalar microprocessors and more particularly to the predecoding of variable byte-length computer instructions within high performance and high frequency superscalar microprocessors.

2. Description of the Related Art

Superscalar microprocessors are capable of attaining performance characteristics which surpass those of conventional scalar processors by allowing the concurrent execution of multiple instructions. Due to the widespread acceptance of the x86 family of microprocessors, efforts have been undertaken by microprocessor manufacturers to develop superscalar microprocessors which execute x86 instructions. Such superscalar microprocessors achieve relatively high performance characteristics while advantageously maintaining backwards compatibility with the vast amount of existing software developed for previous microprocessor generations such as the 8086, 80286, 80386, and 80486.

The x86 instruction set is relatively complex and is characterized by a plurality of variable byte-length instructions. A generic format illustrative of the x86 instruction set is shown in FIG. 1A. As illustrated in the figure, an x86 instruction consists of from one to five optional prefix bytes 4, followed by an operation code (opcode) field 5, an optional addressing mode (Mod R/M) byte 6, an optional scale-index-base (SIB) byte 7, an optional displacement field 8, and an optional immediate data field 9.

The opcode field 5 defines the basic operation for a particular instruction. The default operation of a particular opcode may be modified by one or more prefix bytes. For example, a prefix byte may be used to change the address or operand size for an instruction, to override the default segment used in memory addressing, or to instruct the processor to repeat a string operation a number of times. The opcode field 5 follows the prefix bytes 4, if any, and may be one or two bytes in length. The addressing mode (MODRM) byte 6 specifies the registers used as well as memory addressing modes. The scale-index-base (SIB) byte 7 is used only in 32-bit base-relative addressing using scale and index factors. A base field of the SIB byte specifies which register contains the base value for the address calculation, and an index field specifies which register contains the index value. A scale field specifies the power of two by which the index value will be multiplied before being added, along with any displacement, to the base value. The next instruction field is the optional displacement field 8, which may be from one to four bytes in length. The displacement field 8 contains a constant used in address calculations. The optional immediate field 9, which may also be from one to four bytes in length, contains a constant used as an instruction operand.

Referring now to FIG. 1B, several different variable byte-length x86 instruction formats are shown. The shortest x86 instruction is only one byte long, and comprises a single opcode byte as shown in format (a). For certain instructions, the byte containing the opcode field also contains a register field as shown in formats (b), (c) and (e). Format (j) shows an instruction with two opcode bytes. An optional MODRM byte follows opcode bytes in formats (d), (f), (h), and (j). Immediate data follows opcode bytes in formats (e), (g), (i), and (k), and follows a MODRM byte in formats (f) and (h). FIG. 1C illustrates several possible addressing mode formats (a)–(h). Formats (c), (d), (e), (g), and (h) contain MODRM bytes with offset (i.e., displacement) information. An SIB byte is used in formats (f), (g), and (h).

The definitions of the encodings for the MOD and R/M fields of the MODRM byte are different depending upon whether the processor is operating in 16-bit mode or 32-bit mode. The definitions of the encodings for these fields for each mode are illustrated in FIGS. 1D–1G.

Considering the foregoing, it can readily be surmised that the complexity of the x86 instruction set poses difficulties in implementing high performance x86 compatible superscalar microprocessors. One difficulty arises from the fact that instructions must be aligned with respect to the parallel-coupled instruction decoders of such processors before proper decode can be effectuated. In contrast to most RISC instruction formats, since the x86 instruction set consists of variable byte-length instructions, the start bytes of successive instructions within a line are not necessarily equally spaced, and the number of instructions per line is not fixed. As a result, employment of simple, fixed-length shifting logic cannot in itself solve the problem of instruction alignment.

A further difficulty arises from the fact that certain instructions include scale-index-base calculations for calculating an offset address from the segment address. These calculations, including certain encodings in 16-bit mode, require the addition of three values to determine the offset which accordingly requires a relatively large amount of time for processing. This can limit the speed at which the processor can operate.

Superscalar microprocessors have been proposed that employ instruction predecoding techniques to help solve the problem of quickly aligning, decoding and executing a plurality of variable byte-length instructions in parallel. Improved predecoding techniques are desirable, however, that allow pipeline stages within a processor to be implemented with a relatively small number of cascaded levels of logic gates to thus support high frequency, high performance operations.

SUMMARY OF THE INVENTION

The problems outlined above are in large part solved by a method for predecoding variable byte-length instructions in accordance with the present invention. In one embodiment, a predecode unit is provided which is configured to predecode variable byte-length instructions prior to their storage within an instruction cache. The predecode unit is configured to generate a plurality of predecode bits for each instruction byte. An instruction scanning and alignment mechanism may process the predecode bits to dispatch a variable byte-length instruction to either a decode unit which forms an issue position within the superscalar microprocessor, or to a microcode ROM unit which implements the instruction in microcode.

In one implementation, the predecode unit generates three predecode bits associated with each byte of instruction code: a "start" bit, an "end" bit, and a "functional" bit. The start bit is set if the associated byte is the first byte of the instruction. Similarly, the end bit is set if the byte is the last byte of the instruction. The functional bits convey information regarding the location of an opcode byte for a particular instruction as well as an indication of whether the instruction can be decoded directly by the decode logic of the processor or whether the instruction is executed by invoking a microcode procedure controlled by an MROM unit. Instructions which are directly decoded by the decode logic of the microprocessor are referred to as "fast path" instructions, and the remaining instructions implemented by the microprocessor are referred to as MROM instructions. For fast path instructions, the functional bit is set for each prefix byte included in the instruction, and cleared for other bytes. For MROM instructions, the functional bit is cleared for each prefix byte and is set for other bytes. The type of instruction (either fast path or MROM) may thus be determined by examining the functional bit corresponding to the end byte of the instruction. If that functional bit is clear, the instruction is a fast path instruction. Conversely, if that functional bit is set, the instruction is an MROM instruction. After an MROM instruction is identified, the functional bits for the instruction may be inverted. Subsequently, the opcode for both fast path and MROM instructions may readily be located (by the alignment logic) by determining the first byte within the instruction that has a cleared functional bit.

By utilizing the predecode information generated by the predecode unit, the instruction scanning and alignment logic of the processor may be implemented with a relatively small number of cascaded levels of logic gates, thus accommodating very high frequencies of operation. Instruction alignment to the decode units may further be accomplished with relatively few pipeline stages. In addition, the plurality of decode units to which the variable byte length instructions may be aligned utilize the predecode information to attain relatively fast decoding of the instructions.

In a further implementation, the functional bits are further encoded to indicate scale-index-base operations. Instructions including scale-index-base operations may be dispatched to the MROM unit. If an instruction involving a scale-index-base operation includes at least two bytes after the opcode byte, then the byte after the opcode byte is cleared to indicate the requirement of a scale-index-base operation. Encoding of the functional bits in this manner advantageously allows operations involving scale-index-base calculations to be quickly identified and dispatched to the MROM unit. Quick identification of instructions involving scale-index-base operations may be advantageous since most such operations require three addition operations for address calculation. To simplify functional unit design, such instructions may require dispatch to two functional units, a first of which performs one of the required additions for the address calculation, and the other of which may perform the other addition for address calculation as well as effectuate the desired operation as determined by the opcode.

Broadly speaking, the present invention contemplates a method for predecoding variable byte length instructions in a superscalar microprocessor comprising receiving a plurality of instruction bytes, allocating a functional bit to each of said plurality of instruction bytes, and predecoding said plurality of instruction bytes to determine a location of an opcode byte within each instruction formed by said plurality of instruction bytes. The method further comprises marking said opcode byte within said each instruction by encoding a different value for a functional bit associated with said opcode byte when compared to a value of all functional bits associated with bytes of said each instruction which precede said opcode byte.

The invention also contemplates a superscalar microprocessor comprising an instruction cache for storing a plurality of instruction bytes forming variable byte length instructions, a plurality of decode units coupled to receive decodeable instructions corresponding to said variable byte length instructions and configured to decode said decodeable instructions, and a predecode unit coupled to said instruction cache. The predecode unit is configured to predecode said plurality of instruction bytes prior to their storage within said instruction cache and to generate a functional bit corresponding to each of said plurality of instruction bytes. The predecode unit is also configured to determine a location of an opcode byte within each variable byte length instruction and to generate a different value for a functional bit associated with said opcode byte when compared to a value of all functional bits associated with bytes of said each variable byte length instruction which precede said opcode byte.

BRIEF DESCRIPTION OF THE DRAWINGS

Other objects and advantages of the invention will become apparent upon reading the following detailed description and upon reference to the accompanying drawings in which:

FIG. 1C is a diagram which illustrates several possible x86 addressing mode formats.

FIGS. 1D, 1E, 1F and 1G are tables which illustrate the definitions of the encodings for the MOD and RM fields of the MODRM byte depending upon 16-bit mode or 32-bit mode operation.

FIG. 3 is a table which illustrates exemplary encodings for the functional bits of various exemplary fast path and MROM instructions.

FIG. 11 is a table of issue position combinations which are selected by the selection control unit shown in FIG. 6, according to one embodiment of the selection control unit.

Figure 1A:
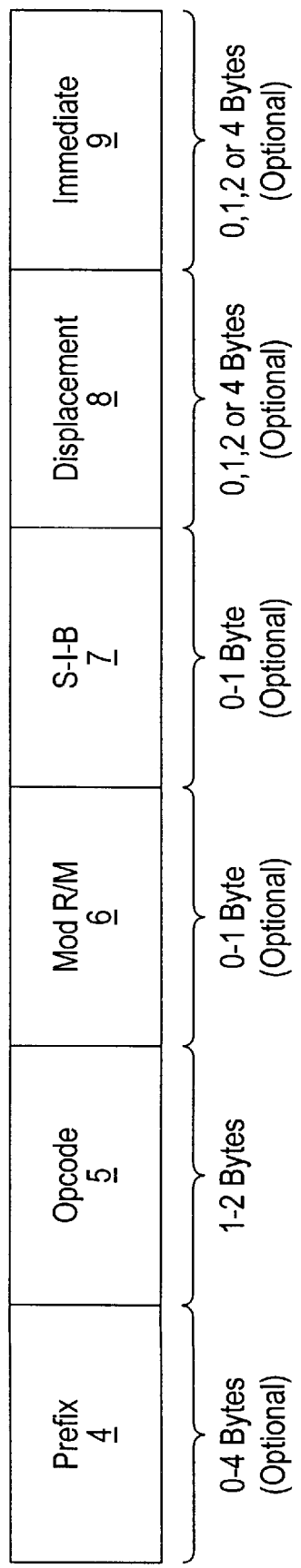
FIG. 1A is a diagram which illustrates the generic x86 instruction set format.
Figure 1B:
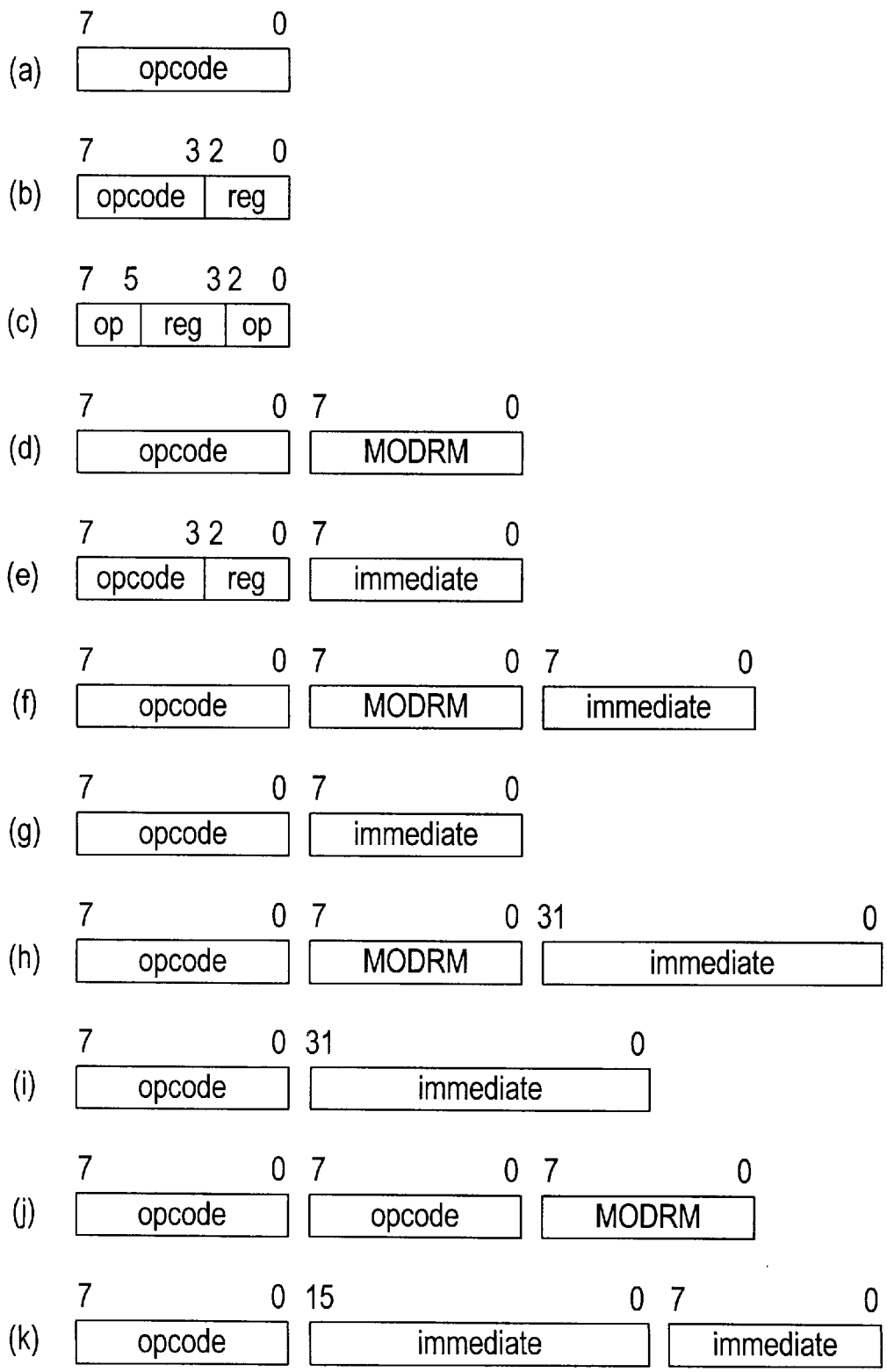
FIG. 1B is a diagram which illustrates several different variable byte-length x86 instruction formats.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
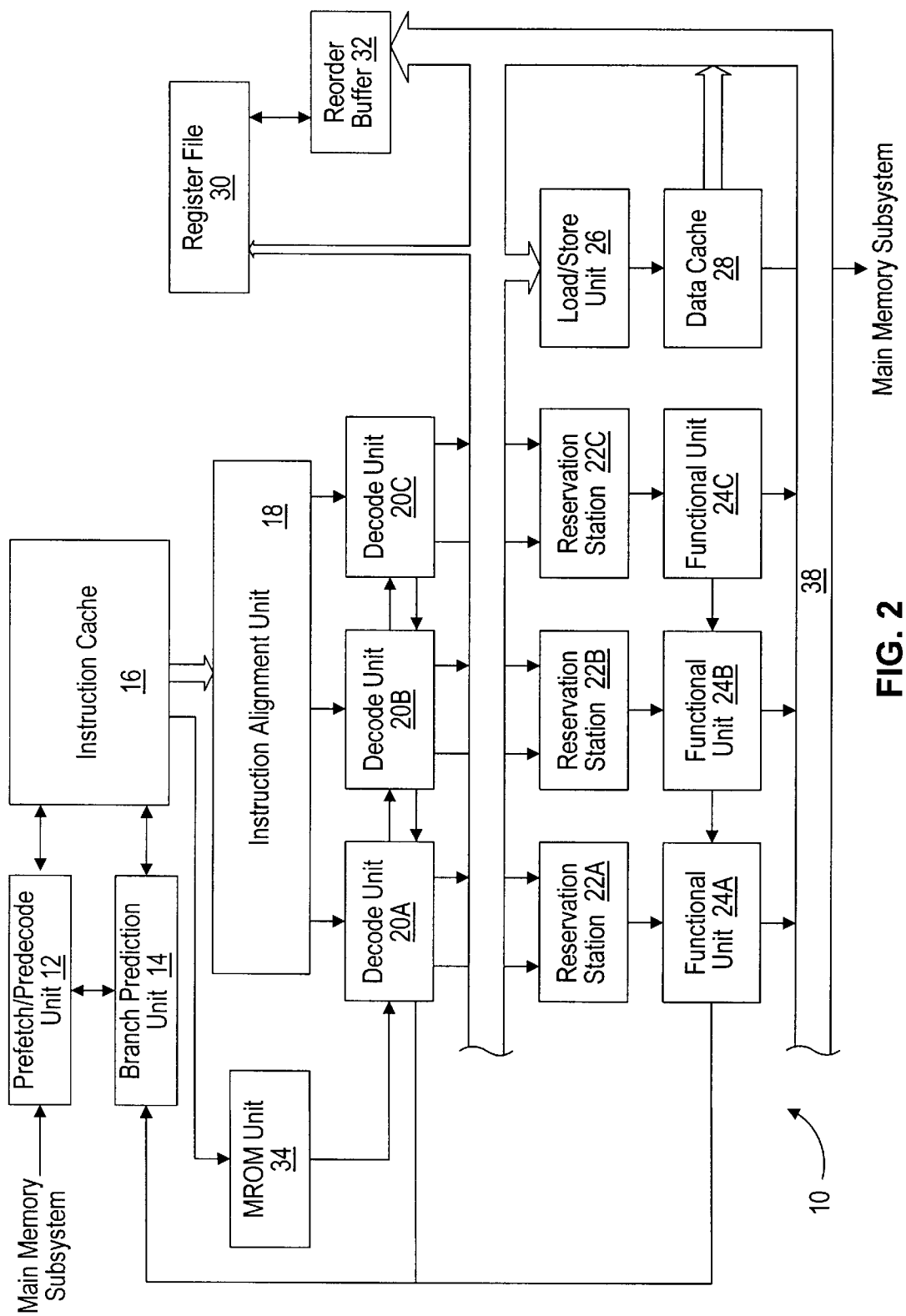
FIG. 2 is a block diagram of one embodiment of a superscalar microprocessor.

Turning now to FIG. 2, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an NMOM unit 34. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in an 8 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing the x86 instruction set will next be described. If a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. For MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of a fast path instruction may thereby be located by determining the first clear functional bit in the instruction. For example, a fast path instruction including two prefix bytes, an opcode byte, a MODRM byte, and a byte of immediate data would have start, end, and functional bits as follows:

Start bits 10000
End bits 00001
Functional bits 11000

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. In one implementation, if the last functional bit of an instruction is set thus indicating an MROM instruction, all functional bits are inverted before qualifying the instruction with the valid bits for prefix and opcode decoding, as will be described in further detail below. A listing of exemplary x86 instructions categorized as fast path instructions will also be provided further below.

FIG. 3 is a table which illustrates exemplary encodings for the functional bits of various exemplary fast path instructions and MROM instructions. As illustrated by the table of FIG. 3, along with the end bit for a particular instruction, if the functional bit associated with the end byte is 1, the instruction is MROM. If the last functional bit is 0, the instruction is fast path. It is noted that in an alternative embodiment, the bits for each encoding are inverted (i.e., a set functional bit for the end byte may be encoded to indicate the instruction is fast path, etc.)

In one specific implementation, to allow expedient identification of instructions involving scale-index-base operations, if there are at least two bytes after the opcode byte, then the byte after the opcode byte is set to indicate the scale-index-base operation. In this implementation, instructions involving scale-index-base operations are always dispatched to MROM unit 34. For 32-bit mode, if the SIB byte is present, then the functional bit corresponding to the MODRM byte is cleared (i.e., set to "0"). For 16-bit mode, the SIB functional bit is cleared for MODRM=01 0xx xxx and 100xx xxx (i.e., MOD=01, R/M=0xx and MOD=10, R/M=0xx.). If MODRM=000xx xxx, the instruction is detected internally by MROM unit 34. Upon encountering such an encoding, MROM unit 34 stalls the pipeline by one clock and implements the instruction via MROM control. For these instructions, the addition operations required to calculate the offset address are performed using two of the processor's issue positions, as described further below.

Thus, the functional bits may be encoded to indicate scale-index-base operations. Instructions including scale-index-base operations may be dispatched to the MROM unit. In the embodiment, if an instruction involving a scale-base-index operation includes at least two bytes after the opcode byte, then the byte after the opcode byte is cleared to indicate the requirement of a scale-index-base operation. Since no additional functional bits are used to provide the SIB indication, efficiency of instruction storage may be increased. Encoding of the functional bits in this manner further advantageously allows operations involving scale-index-base calculations to be quickly identified and dispatched to the MROM unit. Quick identification of instructions involving scale-index-base operations may be advantageous since most SIB instructions require three additions for address calculation before the actual operation as determined by the opcode can be effectuated. To simplify functional unit design, it may therefore be desirable to dispatch such instructions to two functional units, the first of which performs one of the necessary additions for address calculation, and the other of which performs the other addition for address calculation and which effectuates the desired overall operation. It is noted that for certain encodings of SIB instructions which actually only require one addition operation, such instructions may be treated as fast path instructions.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 2, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the finctional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26.

Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 4:
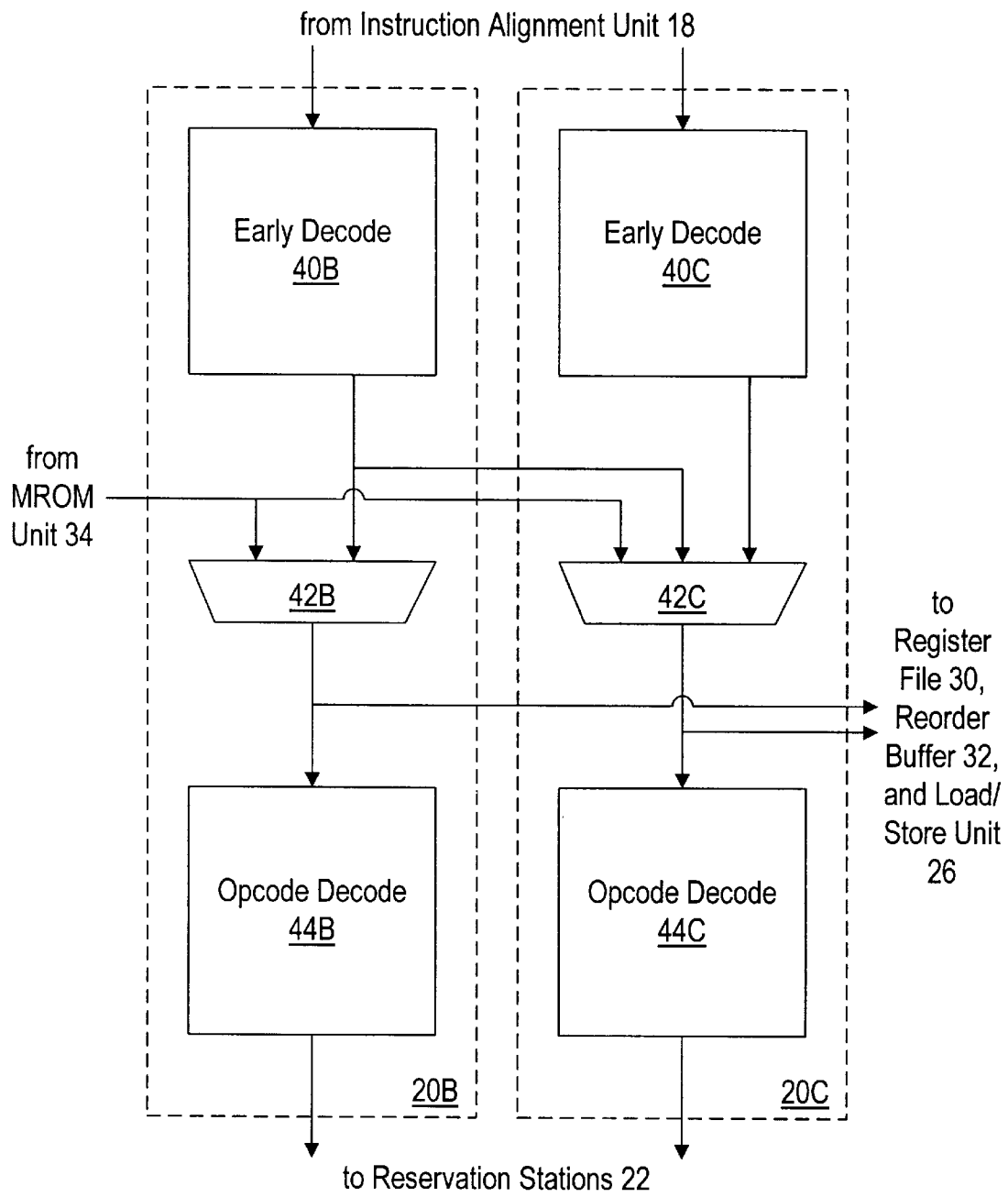
FIG. 4 is a block diagram of one embodiment of a pair of decode units shown in FIG. 2.

Turning now to FIG. 4, a block diagram of one embodiment of decode units 20B and 20C is shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexor 42B, and opcode decode unit 44B. Similarly, decode unit 20C includes early decode unit 40C, multiplexor 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42B is included for selecting between the instructions provided by MROM unit 34 and by early decode unit 40B. During times in which MROM unit 34 is dispatching instructions, multiplexor 42B selects instructions provided by MROM unit 34. At other times, multiplexor 42B selects instructions provided by early decode unit 40B. Similarly, multiplexor 42C selects between instructions provided by MROM unit 34, early decode unit 40B, and early decode unit 40C. The instruction from MROM unit 34 is selected during times in which MROM unit 34 is dispatching instructions. During times in which the early decode unit within decode unit 20A (not shown) detects a double dispatch instruction, the instruction from early decode unit 40B is selected by multiplexor 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;

(ii) decode unconditional branch instructions (which may include the unconditional jump, the CALL, and the RETURN instructions) which were not detected during branch prediction;

(iii) decode source and destination flags;

(iv) decode the source and destination operands which are register operands and generate operand size information; and (v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

Figure 5:
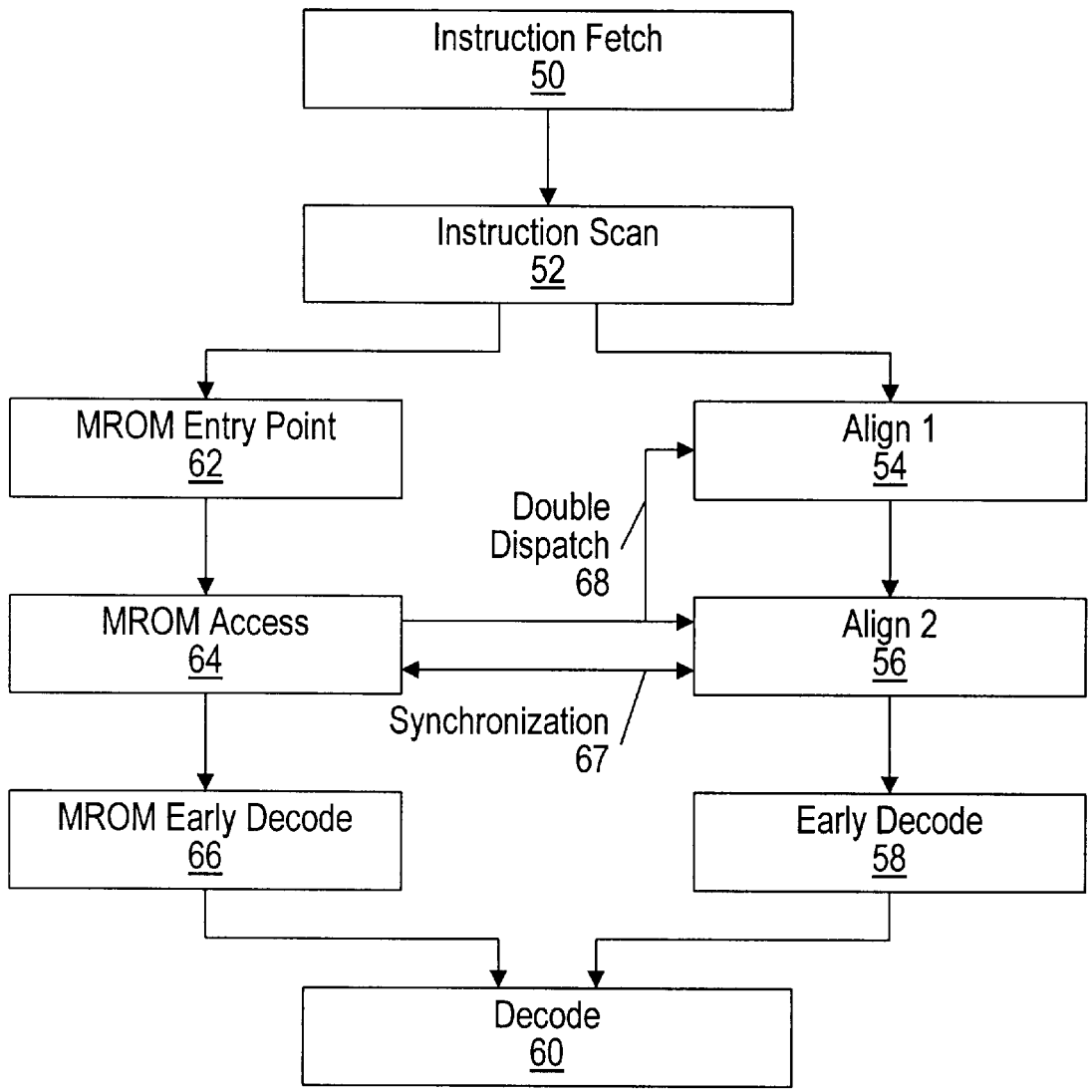
FIG. 5 is a diagram depicting a portion of an instruction processing pipeline employed by one embodiment of the microprocessor shown in FIG. 2.

Turning now to FIG. 5, a diagram depicting instruction processing pipeline stages for one embodiment of microprocessor 10 is shown. Other embodiments of microprocessor 10 may employ dissimilar instruction processing pipelines. The instruction processing pipeline shown in FIG. 5 includes an instruction fetch stage 50, an instruction scan stage 52, a first alignment stage 54, a second alignment stage 56, an early decode stage 58, a decode stage 60, an MROM entry point stage 62, an MROM access stage 64, and an MROM early decode stage 66. MROM entry point stage 62, MROM access stage 64, and MROM early decode stage 66 correspond to MROM unit 34. Instruction fetch stage 50 and instruction scan stage 52 are performed by instruction cache 16. Similarly, first and second alignment stages 54 and 56 correspond to instruction alignment unit 18, early decode stage 58 corresponds to early decode units 40, and decode stage 60 corresponds to opcode decode units 44.

During instruction fetch stage 50, instructions are fetched from instruction cache 16. The instruction cache storage is accessed via a fetch address provided by branch prediction unit 14, and instructions are conveyed to an instruction scanning unit within microprocessor 10. During instruction scan stage 52, the instructions are scanned and instruction blocks are created. The instruction blocks are conveyed to the byte queue within first alignment stage 54. Additionally, MROM instructions are detected during instruction scan stage 52 by monitoring the encodings of the predecode bits, as described above. A detected MROM instruction is routed to MROM entry point stage 62. In one embodiment, MROM unit 34 is configured to accept one instruction per clock cycle. Therefore, if a second MROM instruction is detected within a set of instruction bytes being scanned during a particular clock cycle, instruction blocks including the second MROM instruction and subsequent instructions in program order are stalled until a subsequent clock cycle.

During first alignment stage 54, instructions are selected from the byte queue included therein for dispatch. In one embodiment, up to four instructions are selected for dispatch from which up to three instructions are actually dispatched, as detailed further below. The instructions are conveyed to second alignment stage 56, subsequently to early decode stage 58 and then to decode stage 60.

MROM entry point stage 62 is used to determine a location within the ROM storage of MROM unit 34 at which the first instructions corresponding to a particular MROM instruction are stored. The address is passed to MROM access stage 64, which accesses the ROM storage and receives the instructions stored therein. In one embodiment, a line of instructions (i.e. up to the number of instructions which may be stored in a reorder buffer line) are received during one cycle of ROM storage access. The line of instructions is then transmitted to MROM early decode stage 66, which formats the instructions similar to the formatting of early decode units 40 (such that opcode decode units 44 detect only one type of instruction formatting). The line of instructions is then inserted into opcode decode units 44 via multiplexors 42. For MROM instructions which employ more than a single line of instructions, additional MROM accesses are performed in MROM access stage 64 and subsequent lines of instructions conveyed to MROM early decode stage 66 during subsequent clock cycles. First alignment stage 54 and second alignment stage 56 are stalled during such subsequent clock cycles.

It is noted that, since first alignment stage 54 includes a byte queue storing multiple instructions and the instructions are selected therefrom in program order, a particular MROM instruction may arrive in MROM access stage 64 prior to being selected for dispatch from the byte queue. The particular MROM instruction may be subsequent to a large number of instructions within the byte queue, and instructions are selected for dispatch in program order. (MROM instructions are routed to MROM unit 34 but are not removed from the instruction blocks conveyed to instruction alignment unit 18.) Alternatively, the particular MROM instruction may be queued in MROM unit 34 while a prior MROM instruction executes. The particular MROM instruction may be selected for dispatch prior to arriving at MROM access stage 64. Therefore, synchronization is provided between second alignment stage 56 and MROM access stage 64 (illustrated by synchronization bus 67).

When MROM access stage 64 receives an entry point address from MROM entry point stage 62, MROM access stage 64 informs second align stage 56 by asserting a signal upon synchronization bus 67. When second alignment stage 56 receives a dispatched MROM instruction from first alignment stage 54, second alignment stage 56 signals MROM access stage 56 via synchronization bus 67. In this manner, the MROM instruction progresses to both MROM early decode stage 66 and early decode stage 58 during the same clock cycle. Because both second alignment stage 56 and MROM access stage 64 receive instructions in program order, it is sufficient to synchronize instructions via synchronization bus 67.

During MROM entry point stage 62, MROM unit 34 determines if a particular MROM instruction is double dispatch. A particular MROM instruction is double dispatch if the particular MROM instruction corresponds to a single line of instructions within which two instructions are stored. If MROM unit 34 detects a double dispatch instruction, a double dispatch signal upon a double dispatch conductor 68 is asserted. Otherwise, the double dispatch signal is deasserted. The double dispatch signal is conveyed to both first alignment stage 54 and second alignment stage 56. Second alignment stage 56 uses the state of the double dispatch signal to determine if instructions dispatched during the previous clock cycle (in first alignment stage 54 and therefore currently residing in second alignment stage 56) should be discarded. More particularly, second alignment stage 56 discards the second instruction in program order if: (i) an MROM instruction and a fast path instruction were concurrently dispatched; and (ii) the double dispatch signal is deasserted. Otherwise, second alignment stage 56 passes the instructions to early decode stage 58. It is noted that, although MROM entry point stage 62 detects the double dispatch nature of an MROM instruction, the double dispatch signal as shown in FIG. 3 is asserted from the MROM access stage 64. Alternatively, the double dispatch signal may be asserted from MROM entry point stage 62 and instruction alignment unit 18 may store the signal value for use in the subsequent clock cycle.

First alignment stage 54 uses the double dispatch signal as well. When first alignment stage 54 concurrently dispatches an MROM instruction and a fast path instruction (referred to herein as "packing"), the second of the two instructions in program order is retained in the byte queue. During each clock cycle, first alignment stage 54 initially selects up to four instructions for dispatch during a particular clock cycle. If first alignment stage 54 packed during the previous clock cycle and the double dispatch signal is asserted, then the first of the four instructions (in program order) is ignored and the remainder are dispatched. Conversely, if first alignment stage 54 did not pack during the previous clock cycle or the double dispatch signal is deasserted, the first three of the four instructions (in program order) are dispatched and the fourth is retained by the byte queue. In this manner, redispatch of the second of the packed instructions is performed when needed without sacrificing other dispatch positions.

In one embodiment, instructions identified as involving scale-index-base operations in accordance with the predecode bit encodings as described above result in unique MROM entry points to be generated. In addition, MROM unit 34 is configured to detect the encoding of MODRM=00 0xx xxx and to generate a unique MROM entry point for this encoding. When such an encoding is detected, the pipeline is stalled for one cycle. In this manner, instructions involving scale-index-base operations are implemented in accordance with microcode sequencings that require two issue positions to calculate the offset addresses.

Figure 6:
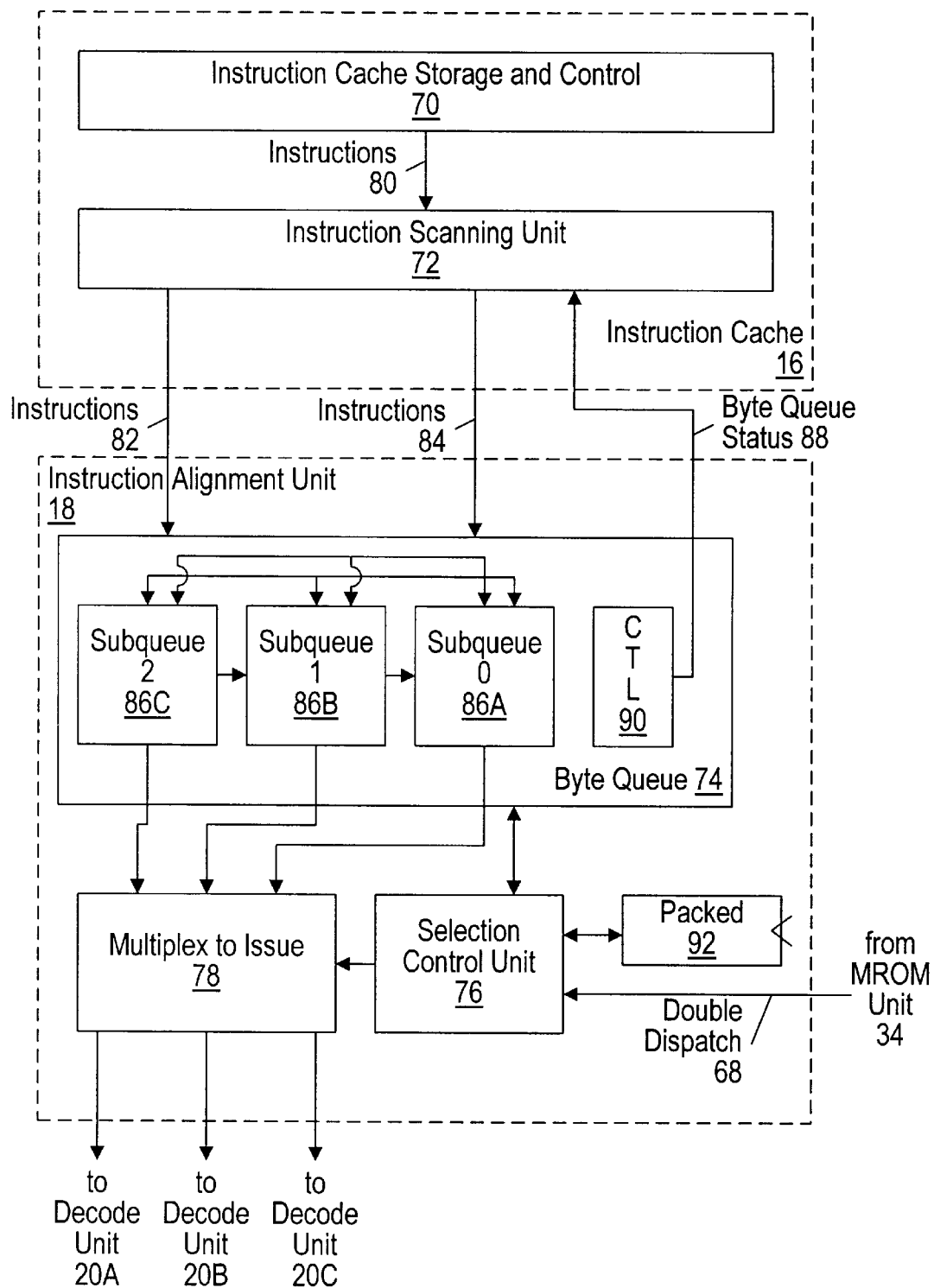
FIG. 6 is a block diagram of one embodiment of an instruction cache and an instruction alignment unit shown in FIG. 2.

Turning now to FIG. 6, a block diagram of one embodiment of instruction cache 16 and instruction alignment unit 18 is shown. Instruction cache 16 includes an instruction cache storage and control block 70 and an instruction scanning unit 72. Instruction alignment unit 18 includes a byte queue 74, a selection control unit 76, and a multiplex to issue block 78.

Instruction cache storage and control block 70 includes storage for instruction cache lines and related control circuitry for fetching instructions from the storage, for selecting cache lines to discard when a cache miss is detected, etc. Instruction cache storage and control block 70 receives fetch addresses from branch prediction unit 14 (not shown) in order to fetch instructions for execution by microprocessor 10. Instruction bytes fetched from instruction cache storage and control block 70 are conveyed to instruction scanning unit 72 upon an instructions bus 80. Instruction bytes are conveyed upon instructions bus 80, as well as corresponding predecode data (e.g. start, end, and functional bits). In one embodiment, sixteen bytes stored in contiguous memory locations are conveyed upon instructions bus 80 along with the corresponding predecode data. The sixteen bytes form either the upper or lower half of the 32 byte cache line. The upper half of the cache line is the half stored in memory addresses having larger numerical values, while the lower half is stored in memory addresses having smaller numerical values. Additionally, instruction scanning unit 72 receives information regarding the bytes within the sixteen bytes which are to be conveyed as instructions to instruction alignment unit 18. Instruction bytes at the beginning of the sixteen bytes may be ignored if the bytes are fetched as the target of a branch instruction, and the target address identifies a byte other than the first byte of the sixteen bytes. Additionally, if a branch instruction is within the sixteen bytes and branch prediction unit 14 predicts the branch taken, then bytes subsequent to the branch instruction within the sixteen bytes are ignored.

Instruction scanning unit 72 scans the predecode data associated with the bytes which are to be conveyed as instructions to instruction alignment unit 18. In one embodiment, instruction scanning unit 72 divides the sixteen bytes conveyed by instruction cache storage and control block 70 into two portions comprising eight contiguous bytes each. One portion forms the lower half of the sixteen bytes (i.e. the bytes stored at smaller numerical addresses than the bytes forming the upper half of the sixteen bytes). The other portion forms the upper half of the sixteen bytes. Therefore, an eight byte portion forms one of four quarters of the 32 byte cache line employed by instruction cache storage and control block 70, according to one embodiment. As used herein, bytes are contiguous if they are stored in contiguous memory locations in the main memory subsystem. It is noted that particular sizes of various components, such as instruction block sizes, are used herein for clarity of the description. Any size may be used for each component within the spirit and scope of the appended claims.

Instruction scanning unit 72 scans the predecode data of each portion of the instructions independently and in parallel. Instruction scanning unit 72 identifies up to a predefined maximum number of instructions within each portion from the start and end byte information included within the predecode data. For the present embodiment, the predefined maximum number is three. Generally speaking, instruction scanning unit 72 preferably identifies a maximum number of instructions in each portion equal to the number of issue positions included within microprocessor 10.

The instruction bytes and instruction identification information generated by instruction scanning unit 72 are conveyed to byte queue 74 upon an instructions bus 82 and an instruction data bus 84, respectively. The instruction bytes are conveyed as eight byte portions, and the instruction data is arranged accordingly such that each eight byte portion is associated with a portion of the instruction identification information conveyed upon instruction data bus 84. Each eight byte portion and the corresponding instruction identification information forms an instruction block. It is noted that, although an instruction block includes eight bytes in the present embodiment, instruction blocks may include any number of bytes in various embodiments. Byte queue 74 receives the instruction blocks conveyed and stores them into one of multiple subqueues included therein. In the embodiment shown, byte queue 74 includes three subqueues: a first subqueue 86A, a second subqueue 86B, and a third subqueue 86C. First subqueue 86A stores the instruction block which is foremost among the instruction blocks stored in byte queue 74 in program order. Second subqueue 86B stores the instruction block which is second in program order, and third subqueue stores the instruction block which is third in program order. It is noted that various embodiments of byte queue 74 may include any number of subqueues 66.

If a particular portion as scanned by instruction scanning unit 72 includes more than the maximum predefined number of instructions, then the particular portion is retained by instruction scanning unit 72. During the following clock cycle, the particular eight byte portion is scanned again. The predecode data corresponding to the previously identified instructions is invalidated such that instruction scanning unit 72 detects the additional instructions. If the other portion concurrently received with the particular portion is subsequent to the particular portion in program order, then the other portion is rescanned as well. Byte queue 74 discards the instruction blocks received from the other portion, in order to retain program order among the instruction blocks stored in the byte queue.

A control unit 90 within byte queue 74 conveys a byte queue status upon byte queue status bus 88 to instruction scanning unit 72. Byte queue status bus 88 includes a signal corresponding to each subqueue 86. The signal is asserted if the subqueue 86 is storing an instruction block, and deasserted if the subqueue 86 is not storing an instruction block. In this manner, instruction scanning unit 72 may determine how many instruction blocks are accepted by byte queue 74 during a clock cycle. If two instruction blocks are conveyed during a clock cycle and only one instruction block is accepted, instruction scanning unit 72 retains the rejected instruction block and rescans the instruction block in the subsequent clock cycle.

As noted above, an instruction block may contain up to a predefined maximum number of instructions (e.g. three in the present embodiment). Additionally, eight contiguous bytes are conveyed for each instruction block in the present embodiment. However, due to the variable byte length of the x86 instructions, an instruction may begin within one set of contiguous bytes and end in another set of contiguous bytes, referred to as overflow instructions. If an overflow instruction is detected, it is identified as the last of the predefined number of instructions. Instead of being indicated as a valid instruction within the instruction block, the overflow instruction is identified as an overflow. Instruction identification information is generated, but the instruction is handled somewhat differently, as will be explained in more detail below.

In one embodiment, the instruction identification information for each instruction includes: (i) start and end pointers identifying the bytes at which the identified instruction begins and ends within the eight bytes; (ii) a valid mask containing eight bits, one for each of the eight bytes; (iii) a bit indicative of whether the instruction is MROM or fast path; and (iv) an instruction valid bit indicating that the instruction is valid and an overflow bit for the last instruction indicating that it is an overflow. The valid mask includes a binary one bit corresponding to each byte included within the particular instruction (i.e. the bits between the start pointer and end pointer, inclusive, are set). Zero bits are included for the other bytes. Additional information conveyed with the instruction identification information is the taken/not taken prediction if the instruction is a branch instruction, bits indicating which of the quarters of the 32 byte cache line the eight bytes correspond to, the functional bits from the predecode data corresponding to the eight bytes, and a segment limit identifying the segment limit within the eight bytes for exception handling. The additional information is provided by instruction cache storage and control block 70 except for the branch prediction, which is provided by branch prediction unit 14.

Selection control unit 76 examines the instruction identification information stored in each subqueue to generate selection controls for multiplex to issue block 78. Multiplex to issue block 78 includes a plurality of multiplexors for selecting instruction bytes from byte queue 74 for conveyance to each of decode units 20. Byte queue 74 maintains certain properties with respect to each subqueue 86 in order to simplify the selection logic within selection control unit 76, as will be explained in more detail below. Instructions are selected and conveyed, and corresponding instruction identification information is invalidated such that subsequent instructions may be dispatched in subsequent clock cycles.

Subqueues 86 store instruction information in a plurality of instruction positions (or simply "positions"). The number of instruction positions is preferably equal to the maximum number of instructions which may be included in an instruction block. For the present embodiment, three positions are included. The first position ("position I0") stores the instruction identification information corresponding to the instruction which is foremost in program order within the instruction block stored in the subqueue 86. The second position ("position I1") stores the instruction identification information corresponding to the second instruction in program order within the instruction block. Finally, the third position ("position I2") stores the instruction identification information corresponding to the last instruction in program order. Alternatively, position I2 may store instruction identification information corresponding to an overflow instruction. Certain instruction identification information is the same for each instruction (e.g. the segment limit). To avoid duplicating information, this instruction information may be stored as a single copy separate from the instructions positions.

Control unit 90 maintains the information stored in each subqueue 86. In particular, control unit 90 directs each subqueue 86 to shift instruction identification information between the positions when instructions are selected for dispatch. For example, if the instruction corresponding to position I0 is dispatched, the information stored in position I1 is shifted into position I0 and the information stored in position I2 is shifted into position I1. Similarly, if the instructions corresponding to positions I0 and I1 are dispatched, then information stored in position I2 is shifted into position I0. In this manner, the instruction within the subqueue which is foremost in program order is maintained in position I0, the instruction which is second in program order is maintained in position I1, etc. In order to select an instruction for dispatch to decode unit 20A, selection control unit 76 examines the instruction identification information stored in position I0 of each subqueue. Advantageously, a small amount of logic may be employed to select the instruction. Similarly, position I0 of subqueue 86A and position I2 of each subqueue 86A–86C are not examined to select an instruction for decode unit 20B. The second instruction to be dispatched will be found within the first two positions of one of the subqueues 66 when maintained in accordance with the above. Selection control unit 76 informs control unit 90 of which instructions positions were selected for dispatch during a clock cycle, such that subqueue shifting may be performed.

According to one embodiment, instruction identification information is shifted internally to each subqueue 86 independently. Instruction identification information is not, therefore, shifted from position I0 of subqueue 86B into positions within subqueue 86A. Instead, when each of the instructions within subqueue 86A have been dispatched, subqueue 86B is shifted into subqueue 86A as a whole. The logic for shifting between subqueues 86 may operate independently from and in parallel with the internal shifting of each subqueue 86A–86C.

Position I2 may store instruction identification information regarding an overflow instruction. If position I2 is storing information regarding an overflow instruction, then the information is not shifted to position I0 or I1 as described above. In this manner, overflow instruction information is always available in position I2. Selection control unit 76 may examine the information stored in position I2 for routing bytes corresponding to an overflow instruction, as opposed to having to locate the overflow information within the positions and then determining byte routing.

Selection control unit 76 selects instructions from the instructions positions within subqueues 86 for potential dispatch. The instructions selected are the instructions which are foremost in program order among the instructions stored in subqueues 86. More instructions are initially selected for dispatch than the number of issue positions included in microprocessor 10, in order to correctly perform redispatch of instructions when an MROM instruction and a fast path instruction are concurrently dispatched and the MROM instruction is found to be an arbitrary dispatch instruction. Selection control unit 76 then selects from the potentially dispatchable instructions based upon the value of a packed state stored in a packed state register 92 coupled to selection control unit 76 and the state of the double dispatch signal upon double dispatch conductor 68, also coupled to selection control unit 76.

When selection control unit 76 selects an MROM instruction and a fast path instruction for concurrent dispatch during a clock cycle, selection control unit 76 sets the packed state. Otherwise, the packed state is reset. The packed state so generated is stored into packed state register 92 for use during the succeeding clock cycle. Additionally, selection control unit 76 informs control unit 90 that the first of the MROM instruction and the fast path instruction (in program order) is being dispatched. In this manner, byte queue 54 retains the second of the two instructions in program order, despite the dispatch of the second of the two instructions. In one embodiment, the packed state comprises a bit indicative, when set, that an MROM instruction and a fast path instruction were concurrently dispatched in the previous clock cycle.

From the potentially dispatchable instructions, selection control unit 76 selects instructions for dispatch based upon the packed state stored in packed state register 92 and the double dispatch signal. If the packed state is set, an MROM instruction and a fast path instruction were concurrently dispatched in the previous clock cycle. Therefore, the instruction within the potentially dispatchable instructions which is foremost in program order is one of the two instructions previously dispatched when the packed state is set. If the packed state is set and the double dispatch signal is asserted, the concurrent dispatch of the MROM instruction and the fast path instruction is successful. If the packed state is set and the double dispatch signal is deasserted, the concurrent dispatch of the MROM instruction and the fast path instruction is unsuccessful. The MROM instruction occupies at least three issue positions, and therefore the fast path instruction cannot be concurrently dispatched for the embodiment of microprocessor 10 shown in FIG. 2. If the packed state is clear, concurrent dispatch of an MROM and fast path instructions was not performed in the previous clock cycle. Therefore, the instructions within the potentially dispatchable instructions were not previously dispatched.

According to one embodiment, selection control unit 76 selects the foremost instructions in program order from the set of potentially dispatchable instructions if either the packed state is clear or the packed state is set and the double dispatch signal is deasserted. In the case of the packed state being clear, the foremost set of instructions are dispatched and program order is maintained. In the case of the packed state being set and the double dispatch signal being deasserted, the second of the instructions dispatched during the previous clock cycle is redispatched. If the second of the instructions is the MROM instruction, it is dispatched alone. If the second of the instructions is the fast path instruction, additional instructions may be selected for concurrent dispatch. Advantageously, the largest number of concurrently dispatchable instructions is selected, even in the case of redispatching a previously dispatched instruction.

If the packed state is set and the double dispatch signal is asserted, then the instruction within the potentially dispatched instructions which is foremost in program order is the second of the previously dispatched instructions and that instruction is successfully dispatched during the previous clock cycle (i.e. the MROM instruction and fast path instruction, when taken together, occupy a number of issue positions less than or equal to the number of issue positions included within microprocessor 10). This instruction is therefore not selected during the current clock cycle. Instead, instructions are dispatched from the remaining of the potentially dispatchable instructions.

Upon selection of the instructions dispatched, the packed state is determined for the subsequent clock cycle. In addition, control unit 90 is informed of the instructions dispatched. For the case of the packed state being set and the double dispatch signal being asserted, the instruction which was previously dispatched is indicated as dispatched as well as each of the instructions dispatched during the present clock cycle. Subqueues 86 are shifted accordingly. In one embodiment, control unit 90 is informed of the subqueue and position storing the last instruction (in program order) to be dispatched. Selection control unit 76 identifies the last instruction in accordance with the above functionality. Byte queue 74 shifts out the instructions prior to and including the indicated last instruction. In this manner, byte queue 74 operates independent of the logic used to concurrently dispatch MROM and fast path instructions. For example, when packing an MROM instruction and a fast path instruction, the first of the instructions in program order is marked as the last instruction. The second of the instructions is thereby retained in byte queue 74 while the first of the instructions is shifted out.

It is noted that, in one embodiment, the circuitry shown in FIG. 6 for instruction alignment unit 18 forms first alignment stage 54. Second alignment stage 56 is not shown in FIG. 6.

Figure 7:
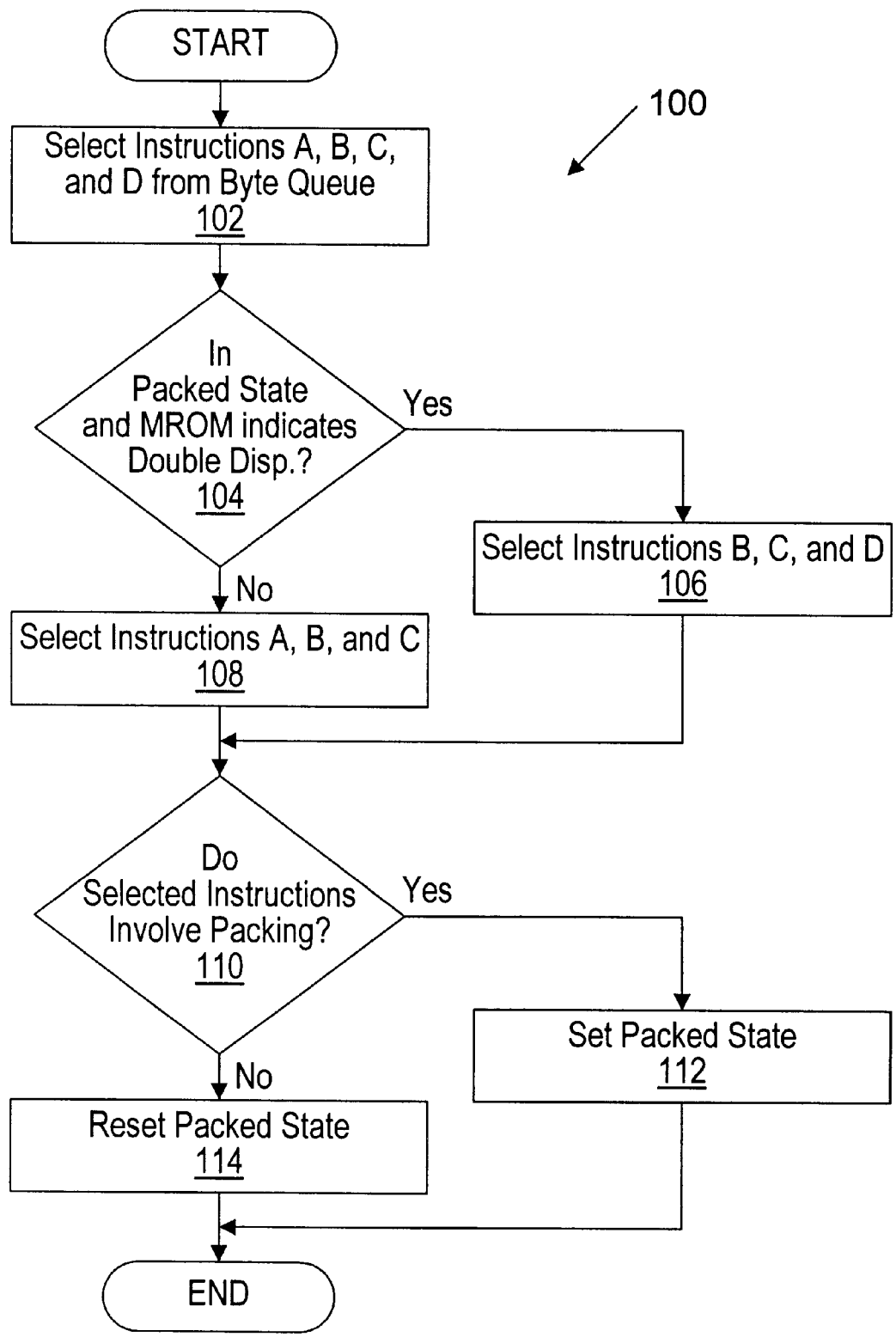
FIG. 7 is a flow chart illustrating operation of the instruction alignment unit shown in FIG. 6 according to one embodiment of the instruction alignment unit.

Turning next to FIG. 7, a flowchart 100 depicting the operation of selection control unit 76 is shown according to one exemplary embodiment. During step 102, selection control unit 76 selects a set of potentially dispatchable instructions. For the present embodiment, up to four instructions (e.g. instructions A, B, C, and D, in program order) may be selected. Preferably, the maximum number of instructions selected into the set of potentially dispatchable instructions is the number of issue positions included in microprocessor 10 plus the number of instructions which may be redispatched due to an unsuccessful concurrent dispatch of MROM instructions and fast path instructions during a previous clock cycle. Therefore, the maximum number of instructions within the potentially dispatchable instructions may vary from embodiment to embodiment.

The selection of instructions according to step 102 may involve certain restrictions. For example, the present embodiment may concurrently dispatch up to three fast path instructions (one for each issue position), a fast path instruction and an MROM instruction, or an MROM instruction alone. Therefore, instructions C and D may not be MROM instructions in the present embodiment. If the instruction which would otherwise be instruction C is an MROM instruction, no instructions are selected as instruction C or D. Furthermore, microprocessor 10 allows up to one predicted taken branch instruction to be concurrently dispatched, according to one embodiment. If a second predicted taken branch instruction is encountered, selection control unit 76 does not select that branch instruction or any subsequent instructions for potential dispatch. According to another embodiment, instructions from at most two cache lines may be concurrently dispatched. If an instruction from a third cache line is encountered, it is not selected for concurrent dispatch. These restrictions may not be applied in other embodiments. Additional or supplemental restrictions may be applied in other embodiments as well.

Decision box 104 determines which of the set of potentially dispatchable instructions are selected for dispatch, based upon the packed state and the double dispatch signal. If the packed state is set and the double dispatch signal is asserted, instructions B, C, and D are selected for dispatch (step 106). In this case, instruction A is one of the previously dispatched instructions. Since the concurrent dispatch of the MROM instruction and the fast path instruction is successful, instruction A need not be redispatched during the present clock cycle. If the packed state is clear or the double dispatch signal is deasserted, then instructions A, B, and C are selected for dispatch (step 108).

Following selection of instructions for dispatch, selection control unit 76 determines the 7 packed state for the subsequent clock cycle (decision block 110). For the present embodiment, if the selected instructions include an MROM instruction and a fast path instruction, then the packed state is set (step 112). The packed state is clear if the selected instructions do not include an MROM instruction and a fast path instruction (step 114).

Generally speaking, a selection method similar to flowchart 100 may be used to speculatively dispatch a set of instructions concurrently. The dispatch is speculative in the sense that the dispatched set of instructions may subsequently be determined to occupy a number of issue positions greater than the number of issue positions included within the microprocessor. Upon such speculative dispatch, the packed state may be set and a number of instructions equal to the maximum number of instructions which may be redispatched are retained in the byte queue. The retained instructions as well as a set of additional instructions may then be preliminarily selected as potentially dispatchable instruction in the succeeding clock cycle, and appropriate selection of instructions from the potentially dispatchable instructions may be performed based upon the result of the speculative dispatch.

Figure 8:
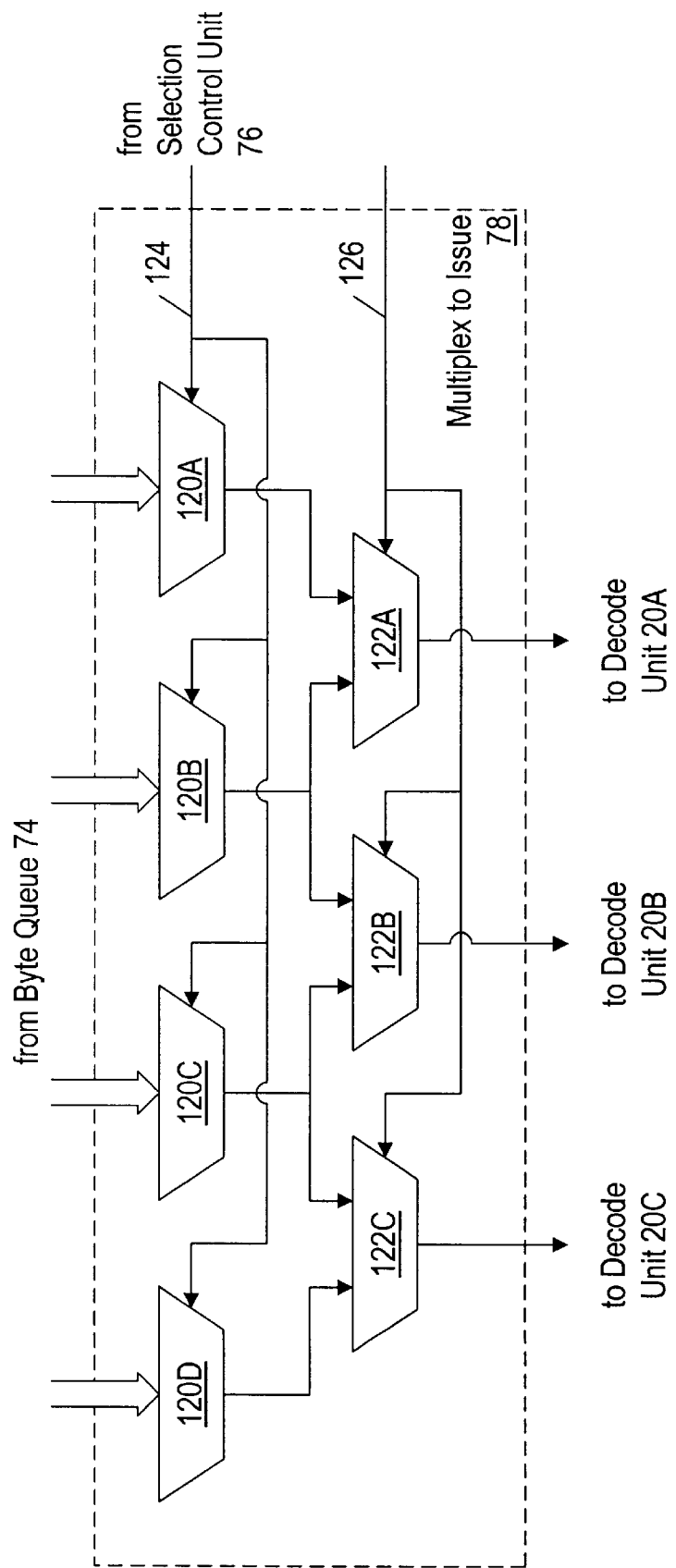
FIG. 8 is a logic diagram of one embodiment of a multiplex to issue unit shown in FIG. 6.

Turning next to FIG. 8, a logic diagram of one embodiment of multiplex to issue block 78 is shown. Multiplex to issue block 78 includes a plurality of first multiplexors 120A–120D and a plurality of second multiplexors 122A–122C. First multiplexors 120 receive a set of selection controls upon a first selection controls bus 124 from selection control unit 76. Each first multiplexor 120 receives a separate set of selection controls, in one embodiment. Similarly, a selection control for multiplexors 122 are received upon second selection controls bus 126. In one embodiment, one selection control is included upon selection controls bus 126. The selection control is shared by second multiplexors 122. Second multiplexor 122A is coupled to first multiplexors 120A and 120B. Similarly, each second multiplexor 122 is coupled to a pair of first multiplexors 120 as shown in FIG. 8. Additionally, each of second multiplexors 122 selects an instruction for conveyance to a corresponding decode unit 20. However, the instruction selected may pass through additional instruction processing pipeline stages prior to arrival in the corresponding decode unit. For example, one embodiment of microprocessor 10 employs the instruction processing pipeline shown in FIG. 5. Instructions pass from second multiplexors 122 through second alignment stage 56 prior to arrival in decode units 20 in that embodiment.

Selection control unit 76 generates selection controls for each first multiplexor 120 by scanning the position information stored in byte queue 74. First multiplexor 120A produces the instruction which is foremost in program order within byte queue 74. Similarly, multiplexors 120B, 120C, and 120D produce the second, third, and fourth instructions in program order from the instructions stored in byte queue 74, respectively.

Second multiplexors 122 are provided for selecting instructions from the potentially dispatchable instructions identified by first multiplexors 120. The selection control upon second selection control bus 126 is toggled in conformance with the flowchart shown in FIG. 7. In other words, the selection control is toggled to cause second multiplexor 122A to select the output of first multiplexor 120A, second multiplexor 122B to select the output of first multiplexor 120B, and second multiplexor 122C to select the output of first multiplexor 120C if step 108 is performed. Alternatively, when step 106 is performed the selection control is toggled to cause second multiplexor 122A to select the output of first multiplexor 120B, second multiplexor 122B to select the output of first multiplexor 120C, and second multiplexor 122C to select the output of first multiplexor 120D.

Figure 9:
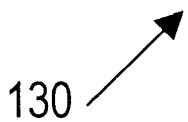
FIG. 9 is a table depicting combinations of instructions which may be stored in a byte queue depicted in FIG. 6, according to one embodiment of the byte queue.

Turning next to FIG. 9, a table 130 is shown identifying the valid combinations of instructions which may be stored within a particular subqueue according to the present embodiment. Other embodiments may employ similar or dissimilar combinations of instructions. Each row of table 130 is a valid combination of instructions, listed by position (I0–I2 as shown across the top of table 130). The symbol "X" in a position indicates an invalid instruction (i.e. no instruction identification information is stored therein). The symbols "A", "B", and "C" indicate that valid instruction identification information is stored in that position. Symbol "A" identifies an instruction prior to instructions identified by symbols "B" and "C" in program order. Similarly, symbol "B" identifies an instruction prior to the instruction identified by symbol "C" in program order. The symbol "O" in position I2 indicates that instruction identification information is stored therein with respect to an overflow instruction. The symbol "O" represents an instruction subsequent to the instructions identified by symbols "A" and "B" in program order.

Table 130 illustrates that instruction identification information is stored in position I1 only when instruction identification information is stored in position I0. Similarly, instruction identification information is stored in position I2 only when instruction identification information is stored in both positions I0 and I1, except when position I2 stores an overflow instruction. When position I2 stores an overflow instruction, position I1 still stores instruction identification information only if position I0 stores instruction identification information. However, position I2 stores the overflow instruction information independent of the status of positions I0 and I1. Advantageously, the instruction which is foremost in program order is stored in position I0, even after instructions from the instruction block have been dispatched. Additionally, overflow instructions remain stored in position I2, even after instructions from the instruction block have been dispatched.

Figure 10:
FIG. 10 is a table depicting instructions analyzed by a selection control unit shown in FIG. 6, according to one embodiment of the selection unit.

Turning next to FIG. 10, a table 132 is shown depicting the positions analyzed by selection control unit 76 for selecting instructions via each first multiplexor 120 in accordance with one embodiment. Each row of table 132 corresponds to a particular first multiplexor 120A–120D, as identified by the first column of table 132. For first multiplexor 120A, selection control unit 76 analyzes the instruction identification information stored in position I0 of each subqueue 86. Additionally, the overflow bit is examined for subqueues 86A and 86B. If position I0 of first subqueue 86A is valid, then that instruction is selected via multiplexor 120A. If position I0 of second subqueue 86B is valid and position I0 of first subqueue 86A is invalid, then the instruction corresponding to position I0 of second subqueue 86B is selected. Finally, the instruction corresponding to position I0 of third subqueue 86C is selected if position I0 of subqueues 86A and 86B are invalid. Because instructions may be up to 15 bytes long, an instruction may begin in first subqueue 86A, overflow into second subqueue 86B, and further overflow into third subqueue 86C. Such a case is an example where position I0 of third subqueue 86C is selected. In addition, the overflow indications from first and second subqueues 86A and 86B are considered in creating multiplexor selection controls for first multiplexor 120A. If position I0 of second subqueue 86B is selected and the overflow indication of first subqueue 86A indicates overflow, then instruction bytes from first subqueue 86A form a portion of the instruction indicated by position I0 of second subqueue 86B. The start pointer and valid mask corresponding to position I2 of subqueue 86A are used to multiplex the instruction bytes with instruction bytes indicated by the end pointer and valid mask corresponding to instruction I0 of subqueue 86B (or subqueue 86C, if the instruction overflows thereto).

For first multiplexor 120B, position I1 of first subqueue 86A is analyzed along with positions I0 and I1 of second and third subqueues 86B and 86C. Because byte queue 74 maintains each subqueue such that instructions are shifted to occupy positions I0 and I1 when previous instructions within the subqueue are dispatched, position I1 is the only position within first subqueue 86A which may contain the second instruction in program order which is to be dispatched during a clock cycle. Similarly, positions I0 and I1 of subqueues 86B and 86C may contain the second instruction to be dispatched. If a position I0 is selected for dispatch, the overflow indication of the preceding subqueue is also analyzed for forming multiplexor selection controls.

For first multiplexor 120C, position I2 of first subqueue 86A is analyzed along with each of the positions of second and third subqueues 86B and 86C. Similar to the above discussion, if position I0 of a subqueue is selected, the overflow indication of the preceding subqueue is analyzed to determine multiplexor selection controls. Finally, selection control unit 76 considers the positions of subqueues 86B and 86C to determine selection controls for first multiplexor 120D. Since first multiplexor 120D selects the fourth instruction in program order, positions within first subqueue 86A are not considered for selection via multiplexor 120D. Positions within first subqueue 86A store at most the first three instructions in program order, according to the present embodiment.

Table 132 illustrates certain advantages of operating byte queue 74 in the manner described herein. Selection of the instructions for first multiplexor 120A involves analyzing only three positions out of the nine positions included within byte queue 74. If byte queue 74 where implemented as, for example, a circular buffer, then each of the positions would have to be considered for dispatch to issue position zero. Similarly, analysis of only a few issue positions is performed to select the instruction for first multiplexor 120B. Selection logic is thereby reduced, allowing for fewer cascaded levels of logic. A higher operating frequency for microprocessor 10 may thereby be achieved.

Table 132 shows the positions analyzed to select instructions for issue. However, even though an instruction may be selectable for issue based upon table 132, other factors may cause a particular instruction not to be issued. For example, the instruction in position I0 of second subqueue 86B may be selected by multiplexor 120B according to table 132. However, the instruction in position I0 of first subqueue 86A may be an MROM instruction. Because microprocessor 10 dispatches MROM instructions without concurrent issue of other MROM instructions, the instruction in position I0 of second subqueue 86B is not selected if it is an MROM instruction. Other such restrictions may be imposed depending upon the embodiment of microprocessor 10, and may be include within the logic of selection control unit 58.

Turning next to FIG. 11, a table 134 is shown depicting the allowable issue position combinations (i.e. the selections by second multiplexors 122 under control of selection control unit 76) according to one embodiment of microprocessor 10. Each row of table 134 indicates an allowable combination of instructions, wherein each column is an issue position. A "–" in an issue position indicates that no instruction is dispatched to that issue position. An instruction may not be dispatched to a particular issue position for a variety of reasons. For example, dispatch restrictions included according to a particular embodiment of microprocessor 10 may cause an issue position not to receive an instruction during a clock cycle. One embodiment of microprocessor 10 restricts concurrent issue of instructions with an MROM instruction to up to one fast path instruction. Therefore, rows 136 and 138 are allowable combinations in which issue position two does not receive an instruction. Additionally, byte queue 74 may contain only a few instructions during a particular clock cycle (in the case of a fetch miss in instruction cache 16, for example). Therefore, selection control unit 76 selects the available instructions and no instructions are conveyed in the remaining issue positions. An "F" in an issue position indicates a fast path instruction, while an "M" indicates an MROM instruction.

Rows 136 and 138 are cases in which the packed state described above is set, for embodiments employing the set of allowable issue position combinations represented by table 134. Other rows in table 134 do not cause the setting of the packed state.

Figure 12:
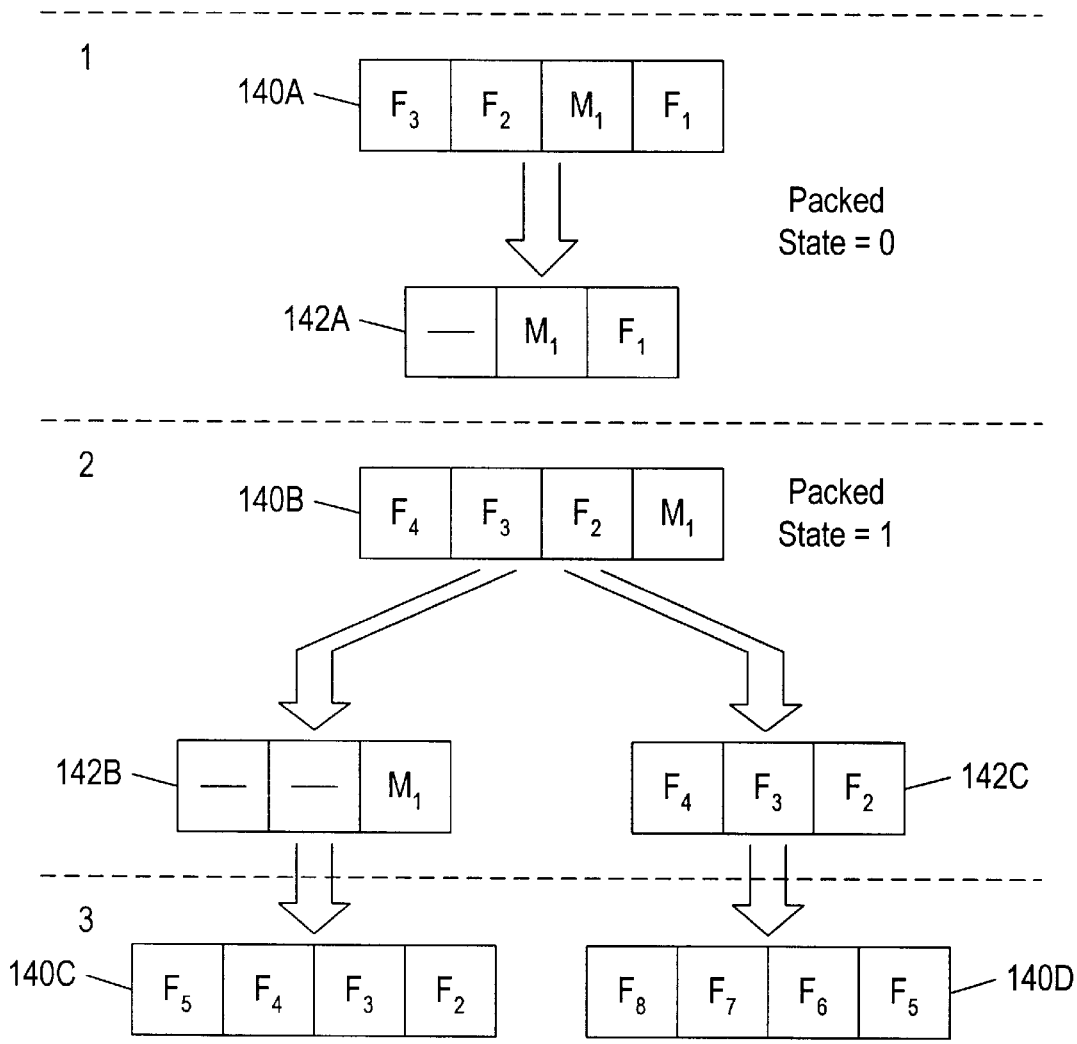
FIG. 12 is an example of instruction selection.

Turning now to FIG. 12, a first example of operation of selection control unit 76, first multiplexors 120, and second multiplexors 122 is shown in accordance with one embodiment of microprocessor 10. A set of clock cycles are depicted, separated by dashed horizontal lines. The clock cycles are numbered 1, 2, and 3. For each clock cycle, the selections of first multiplexors 120 are shown via a block 140A–140D, and the selections of second multiplexors 122 are shown via a block 142A–142C. Instructions within a block are listed from right to left in program order (i.e. instruction $F_1$ in block 140A is prior to the other instructions in program order). Instructions are represented by an "F" for fast path instructions or an "M" for MROM instructions. A subscript is used to identify different fast path and MROM instructions.

During clock cycle 1, a set of potentially dispatchable instructions is selected via first multiplexors 120 (block 140A). It is noted that instructions $F_2$ and $F_3$ are shown in block 140A to depict instructions subsequent to instruction $M_1$. However, selection control unit 76 may not actually select instructions $F_2$ and $F_3$ since $F_1$ and $M_1$ comprise an allowable combination as shown in table 134. Alternatively, instructions $F_2$ and $F_3$ may be selected by first multiplexors 120C and 120D, but may not be selected by second multiplexors 122. Still further, the instructions may be routed through first multiplexors 120 and second multiplexors 122, but may be indicated to be invalid such that subsequent stages of the instruction processing pipeline ignore the instructions. As shown in block 142A, instructions $F_1$ and $M_1$ are selected by second multiplexors 122A and 122B, respectively. Second multiplexor 122C does not select a valid instruction since instructions $F_1$ and $M_1$ are concurrently dispatched. Additionally, selection control unit 76 sets the packed state, as shown in clock cycle 2. Since instructions $F_1$ and $M_1$ are speculatively dispatched concurrently, instruction $M_1$ is retained within byte queue 74 for potential redispatch.

During clock cycle 2, instructions $M_1$, $F_2$, $F_3$, and $F_4$ are selected as a set of potentially dispatchable instructions (block 140B). Because the packed state is set, the double dispatch signal form MROM unit 34 is used to select which instructions from block 140B are dispatched. When the double dispatch signal is received, one of two possible sets of instructions are selected. If the double dispatch signal is deasserted, the instructions are selected as shown in block 142B. For this case, instruction $M_1$ was determined to not be a double dispatch instruction. Therefore, instruction $M_1$ is redispatched. Additionally, other instructions are not concurrently dispatched with instruction $M_1$. Alternatively, the double dispatch signal may be asserted, resulting in the instruction selection shown in block 142C. Instruction $M_1$ is not redispatched. Instead, instructions subsequent to $M_1$ are dispatched (i.e. instructions $F_2$, $F_3$, and $F_4$). Blocks 140C and 140D depict instructions selected as potentially dispatchable instructions during clock cycle 3 for the cases represented by blocks 142B and 142C, respectively.

Figure 13:
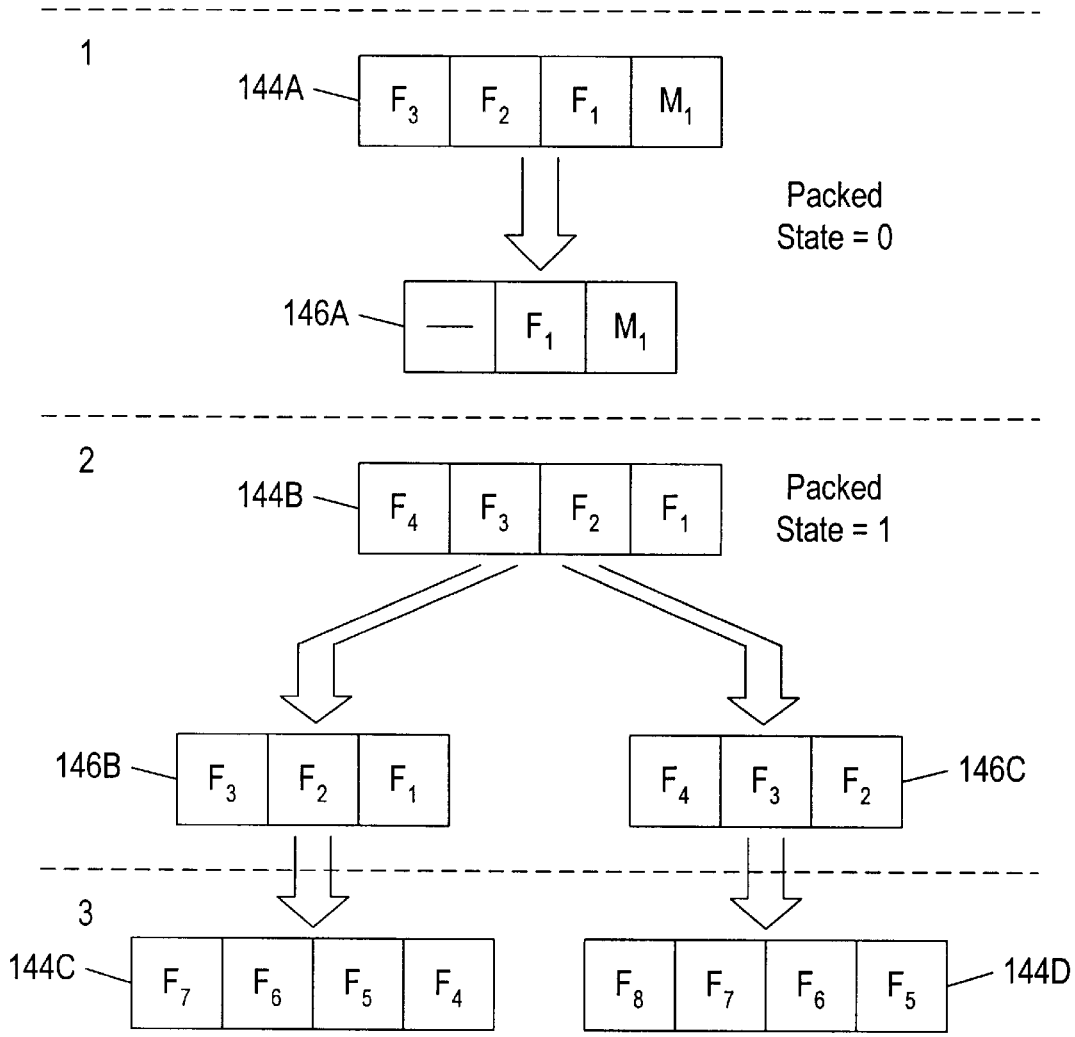
FIG. 13 is a second example of instruction selection.

Turning now to FIG. 13, a second example of operation of selection control unit 76, first multiplexors 120, and second multiplexors 122 is shown in accordance with one embodiment of microprocessor 10. For each clock cycle, the selections of first multiplexors 120 are shown via a block 144A–144D, and the selections of second multiplexors 122 are shown via a block 146A–146C. Instructions within a block are listed from right to left in program order (i.e. instruction $M_1$ in block 140A is prior to the other instructions in program order). Instructions are represented by an "F" for fast path instructions or an "M" for MROM instructions. A subscript is used to identify different fast path and MROM instructions.

Clock cycle 1 in FIG. 13 is similar to clock cycle 1 in FIG. 12, except that instructions $M_1$ and $F_1$ are in reverse order for this example. Therefore, instruction $F_1$ is retained in byte queue 74 while being dispatched during clock cycle 1. Instruction $M_1$ is discarded, and the packed state is set for clock cycle 2. During clock cycle 2, instructions are selected via first multiplexors 120 as shown in block 144B. Since the packed state is set, one of two possible sets of instructions may be selected from the instructions in block 144B. Block 146B shows the instructions selected if the double dispatch signal is deasserted, while block 146C shows the instructions selected if the double dispatch signal is asserted. Blocks 144C and 144D depict instructions selected by first multiplexors 120 during clock cycle 3 for the cases shown in blocks 146B and 146C, respectively.

As block 146B of example of FIG. 13 shows, when the fast path instruction is the instruction redispatched due to an unsuccessful concurrent dispatch of an MROM and fast path instruction, additional instructions may be dispatched as well. Advantageously, dispatch bandwidth may be maximized even during clock cycles in which a redispatch is performed.

Figure 14:
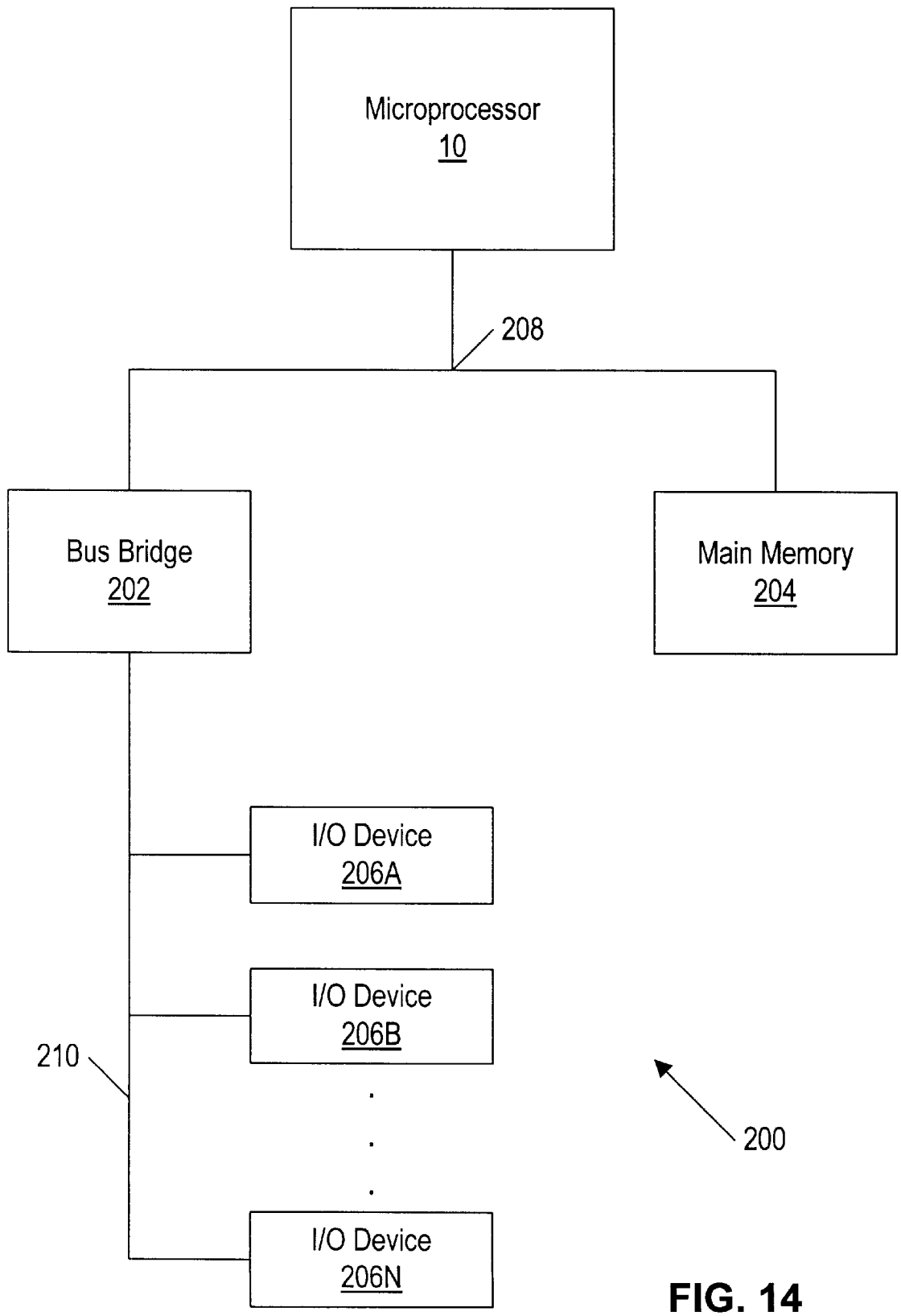
FIG. 14 is a block diagram of a computer system including the microprocessor shown in FIG. 2.

Turning now to FIG. 14, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 14 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration.

It is also noted that, although double dispatch MROM instructions are described above with respect to dispatching microcode instructions concurrently with directly-decoded instructions, the present discussion applies to many different configurations. For example, for a microprocessor having four issue positions, microcode instructions which are parsed into two or three simpler instructions may be concurrently dispatched with two or one directly-decoded instructions, respectively. Such an embodiment might select a microcode instruction and two directly-decoded instructions for concurrent dispatch. If the microcode instruction is parsed into two instructions, then the concurrent dispatch is successful. If the microcode instruction is parsed into three instructions, then the concurrent dispatch of one of the directly-decoded instructions may be successful. Redispatch of one of the concurrently dispatched instructions occurs. If the microcode instruction is parsed into four or more instructions, then the concurrent dispatch is unsuccessful and redispatch of two of the concurrently dispatched instructions occurs. Similarly, additional issue positions may be added with extensions to the number of possible concurrent dispatches and the number of redispatch scenarios. Any number of issue positions may be employed within various embodiments. Still further, although microcode instructions are divided depending upon the use of two issue positions or more than two issue positions, any division may be used. Continuing the four issue position example, microcode instructions may be specified as three dispatch or more than three dispatch. Microcode instructions which actually use two issue positions would waste an issue position, but the number of redispatch scenarios is decreased. Still further, if a microcode instruction occupies each of the issue positions for several clock cycles, but the last clock cycle of instruction issue does not occupy each of the available issue positions, directly-decoded instructions subsequent to the microcode instruction may be dispatched during the last clock cycle of instruction issue by MROM unit 34 in response to the microcode instruction. In this case, a number of issue positions occupied is passed to selection control unit 76. Selection control unit 76 determines the number of instructions to be redispatched from the number of instructions selected for dispatch and the number of issue positions occupied by the instructions issue by MROM unit 34.

Although the x86 microprocessor architecture and instruction set have been used as a specific example herein, it is noted that the apparatus and method described herein may be applicable to any microprocessor which employs variable byte length instructions and/or microcode and directly-decoded instructions. Such embodiments are contemplated.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1 x86 Fast Path, Double Dispatch, and MROM Instructions

| X86 Instruction | Instruction Category |
|---|---|
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path/double dispatch |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |

TABLE 1-continued x86 Fast Path, Double Dispatch, and MROM Instructions

| X86 Instruction | Instruction Category |
|---|---|
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MROM |
| LSL | MROM |
| LTR | MROM |
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |

TABLE 1-continued x86 Fast Path, Double Dispatch, and MROM Instructions

| X86 Instruction | Instruction Category |
|---|---|
| POPF | MROM |
| POPFD | MROM |
| PUSH | fast path/double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | double dispatch |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

Note: Instructions including an SIB byte are also considered double dispatch instructions.

Numerous variations and modifications will become apparent to those skilled in the art once the above disclosure is fully appreciated. It is intended that the following claims be interpreted to embrace all such variations and modifications.

What is claimed is:

1. A superscalar microprocessor comprising:
   an instruction cache for storing a plurality of instruction bytes forming variable byte length instructions;
   a plurality of decode units coupled to receive decodeable instructions corresponding to said variable byte length instructions and configured to decode said decodeable instructions; and
   a predecode unit coupled to said instruction cache, wherein said predecode unit is configured to predecode said plurality of instruction bytes prior to their storage within said instruction cache and to generate a functional bit corresponding to each of said plurality of instruction bytes, wherein said predecode unit is configured to determine a location of an opcode byte within each variable byte length instruction;
   wherein said predecode unit is configured to set each functional bit associated with bytes of said each of said variable byte length instructions that precede said opcode byte of said each of said variable byte length instructions to a first value, wherein said predecode unit is configured to set each functional bit associated with said opcode byte of said each of said variable byte length instructions to a second value, wherein said predecode unit is configured to set each functional bit associated with bytes of said each of said variable byte length instructions that succeed said opcode byte of said each of said variable byte length instructions to said second value, wherein said second value differs from said first value, and wherein a transition form said first value to said second value between functional bits of adjacent bytes of said each of said variable byte length instructions is created to indicate a position of said opcode byte within said each of said plurality of instructions;
   and wherein said first value is logical low for some of said variable byte length instructions and is logical high for others of said varible byte length instructions.

2. The superscalar microprocessor as recited in claim 1 wherein said predecode unit is further configured to store said functional bits corresponding to said plurality of instruction bytes within said instruction cache.

3. The superscalar microprocessor as recited in claim 1 wherein said the predecode unit is further configured to generate a start bit corresponding to each of said plurality of instruction bytes and to predecode said plurality of instruction bytes to determine a starting byte of said each variable byte length instruction, and wherein said predecode unit is configured to set said start bit associated with said starting byte of said each variable byte length instruction to identify said starting byte and to clear said starting bit corresponding to all subsequent bytes within said each variable byte length instruction.

4. The superscalar microprocessor as recited in claim 3 wherein said predecode unit is further configured to generate an end bit corresponding to each of said plurality of instruction bytes and to predecode said plurality of instruction bytes to determine an end byte of said each variable byte length instruction, and wherein said predecode unit is configured to set an end bit associated with said end byte of said each variable byte length instruction to identify said end byte and to clear said end bit corresponding to each preceding byte within said each variable byte length instruction.

5. The superscalar microprocessor as recited in claim 4 wherein said predecode unit is configured to store said start bit and said end bit corresponding to each of said plurality of instruction bytes within said instruction cache.

6. The superscalar microprocessor as recited in claim 1 further comprising an instruction alignment unit coupled between said instruction cache and said plurality of decode units and configured to provide said decodeable instructions from said instruction cache to said plurality of decode units.

7. The superscalar microprocessor as recited in claim 1 further comprising a microcode ROM unit coupled to said instruction cache and configured to implement selected variable byte length instructions in microcode.

8. The superscalar microprocessor as recited in claim 7 wherein said predecode unit is further configured to set a functional bit associated with a byte subsequent to said opcode byte of said each variable byte length instruction to said first value if a scale-index-base byte is present.

9. The superscalar microprocessor as recited in claim 1, wherein a value of said functional bit associated with an end byte of said each of said variable byte length instructions indicates whether said each of said variable byte length instructions is directly decodable by said plurality of decode units or whether said each of said plurality of instructions is implemented by invoking a microcode ROM routine.

10. A method for predecoding variable byte length instructions in a superscalar microprocessor comprising:

receiving a plurality of instruction bytes in a predecode unit, wherein said plurality of instruction bytes comprise a plurality of instructions;

determining a location of a start byte within said each of said plurality of instructions;

determining a location of an end byte within said each of said plurality of instructions;

determining a location of an opcode byte within each of said plurality of instructions;

generating a predecode tag for each of said plurality of instruction bytes, wherein each predecode tag includes a start bit, an end bit and a functional bit;

wherein said generating includes setting each start bit associated with said start byte within said each of said plurality of instructions to identify said starting byte within said each of said plurality of instructions;

wherein said generating includes setting each end bit associated with said end byte within said each of said plurality of instructions to identify said end byte within said each of said plurality of instructions;

wherein said generating includes setting each functional bit associated with bytes of said each of said plurality of instructions that precede said opcode byte of said each of said plurality of instructions to a first value, wherein said generating includes setting each functional bit associated with said opcode byte of said each of said plurality of instructions to a second value, wherein said generating includes setting each functional bit associated with bytes of said each of said plurality of instructions that succeed said opcode byte of said each of said plurality of instructions to said second value, wherein said second value differs from said first value, and wherein a transition from said first value to said second value between adjacent bytes of said each of said plurality of instructions is created to indicate a position of said opcode byte within said each of said plurality of instructions;

and wherein said first value is logical low for some of said variable byte length instructions and is logical high for others of said variable byte length instructions.

11. The method as recited in claim 10, wherein said second value of said functional bit associated with said end byte of said each of said plurality of instructions indicates whether said each of said plurality of instructions is directly decodable by decoding logic within said superscalar microprocessor or whether said each of said plurality of instructions is implemented by invoking a microcode ROM routine.

12. The method as recited in claim 10, wherein said variable byte length instructions are encoded in accordance with the following format:

| Predecode Bits | Byte Number 01234 | Type of Instruction |
|---|---|---|
| Start bit | 1000 | MROM, no prefix |
| Func bit | 1111 | opcode is at first byte. |
| Start bit | 1000 | MROM, one prefix |
| Func bit | 0111 | opcode is at second byte. |
| Start bit | 10000 | MROM, three prefixes |
| Func bit | 00011 | opcode is at fourth byte |
| Start bit | 1000 | Fast path, no prefix |
| Func bit | 0000 | opcode is at first byte |
| Start bit | 1000 | Fast path, one prefix |
| Func bit | 1000 | opcode is at second byte |
| Start bit | 10000 | Fast path, three prefix |
| Func bit | 11100 | opcode is at fourth byte. |

13. The method as recited in claim 10, further comprising:
   determining whether a scale-index-base byte is present within said each of said plurality of instructions; and
   setting said each functional bit associated with bytes of said each of said plurality of instructions that succeed said opcode byte of said each of said plurality of instructions to said first value for said each of said plurality of instructions where said scale-index-base byte is present.

14. The method as recited in claim 13, wherein said first value of said functional bit associated with said end byte of said each of said variable byte length instructions indicates whether said each of said variable byte length instructions is directly decodable by said plurality of decode units or whether said each of said plurality of instructions is implemented by invoking a microcode ROM routine.

15. The method as recited in claim 10, wherein said plurality of instructions comprise x86 instructions.

16. The method as recited in claim 10, wherein said bytes of said each of said plurality of instructions that precede said opcode byte of said each of said plurality of instructions comprise prefix bytes.

17. A computer system comprising:
   a microprocessor including:
      an instruction cache for storing a plurality of instruction bytes forming variable byte length instructions;
      a plurality of decode units coupled to receive decodeable instructions corresponding to said variable byte length instructions and configured to decode said decodeable instructions; and
      a predecode unit coupled to said instruction cache, wherein said predecode unit is configured to predecode said plurality of instruction bytes prior to their storage within said instruction cache and to generate a functional bit corresponding to each of said plurality of instruction bytes, wherein said predecode unit is configured to determine a location of an opcode byte within each variable byte length instruction;
      wherein said predecode unit is configured to set each functional bit associated with bytes of said each of said variable byte length instructions that precede said opcode byte of said each of said variable byte length instructions to a first value, wherein said predecode unit is configured to set each functional bit associated with said opcode byte of said each of said variable byte length instructions to a second value, wherein said predecode unit is configured to set each functional bit associated with bytes of said each of said variable byte length instructions that succeed said opcode byte of said each of said variable byte length instructions to said second value, wherein said second value differs from said first value, and wherein a transition from said first value to said second value between adjacent bytes of said each of said variable byte length instructions is created to indicate a position of said opcode byte within said each of said plurality of instructions;

and wherein said first value is logical low for some of said variable byte length instructions and is logical high for others of said variable byte length instructions; and an input/output (I/O) device coupled to said microprocessor and to another computer system, wherein said I/O device is configured to communicate between said microprocessor and said another computer system.

18. The computer system as recited in claim 17, wherein said I/O device comprises a modem.

* * * * *